United States Patent
Qiu et al.

(10) Patent No.: US 12,530,406 B1
(45) Date of Patent: Jan. 20, 2026

(54) BUCKET SEARCH METRIC BASED REBALANCING ACROSS PEERS

(71) Applicant: Cisco Technology, Inc., San Jose, CA (US)

(72) Inventors: Wendi Qiu, Norwest (AU); Alastair Jeffrey Barnett, Canberra (AU); Sayantan Bhattacharyya, The Ponds (AU); Iuri Chaer, London (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/740,491

(22) Filed: Jun. 11, 2024

(51) Int. Cl.
*G06F 16/903* (2019.01)

(52) U.S. Cl.
CPC .............................. *G06F 16/90335* (2019.01)

(58) Field of Classification Search
CPC ............. G06F 16/90335; G06F 16/215; G06F 16/217; G06F 16/245; G06F 16/2471; G06F 16/353
See application file for complete search history.

(56) References Cited

U.S. PATENT DOCUMENTS

| | | | |
|---|---|---|---|
| 10,984,044 B1 * | 4/2021 | Batsakis | G06F 16/907 |
| 2018/0173785 A1 * | 6/2018 | Dangayach | G06F 16/285 |
| 2021/0109949 A1 * | 4/2021 | Zbarsky | G06F 16/2471 |

FOREIGN PATENT DOCUMENTS

WO  WO-2016088212 A1 *  6/2016  ............. G06F 16/00

* cited by examiner

*Primary Examiner* — Hares Jami
(74) *Attorney, Agent, or Firm* — Shook, Hardy & Bacon L.L.P.

(57) ABSTRACT

Bucket search metric-based rebalancing across peers includes obtaining bucket search metrics of searches performed on buckets located on peer nodes. The bucket search metrics are aggregated on a per peer node basis to obtain an aggregated bucket search metric for each peer node. An average aggregated bucket search metric is calculated across the peer nodes. The first subset of the peer nodes having the aggregated bucket search metric greater than the average aggregated bucket search metric is identified. The first subset includes a source peer node of the first subset having a deviation of an aggregated bucket search metric of the source peer node from the average aggregated bucket search metric. One or more buckets on the source peer node are moved from the source peer node to at least one target peer node of a second subset of the peer nodes.

20 Claims, 15 Drawing Sheets

900

```
Obtain bucket search metrics of searches performed on buckets located on peer nodes
902
                                      ↓
Aggregate the bucket search metrics on a per peer node basis to obtain an aggregated
                    bucket search metric for each peer node
                                      904
                                      ↓
Calculate an average aggregated bucket search metric across the peer nodes using the
            aggregated bucket search metric for each peer node 906
                                      ↓
Identify a first subset of the peer nodes having the aggregated bucket search metric
              greater than the average aggregated bucket search metric
                                      908
                                      ↓
Identify a second subset of the peer nodes having the aggregated bucket search metric
                less than the average aggregated bucket search metric
                                      910
                                      ↓
Select, for a source peer node of the first subset, a subset of the buckets based on the first
   subset having corresponding bucket search metrics matching a first deviation of the
  aggregated bucket search metric of the source peer node from the average aggregated
                              bucket search metric
                                      912
                                      ↓
Select at least one target peer node of the second subset based on the at least one target
  peer node having a second deviation totaling a corresponding aggregated bucket search
                          metric of the subset of buckets
                                      914
                                      ↓
     Move the subset of the buckets from the source peer node to the at least one target peer
                                      node
                                      916
```

FIG. 9

BUCKET SEARCH METRIC BASED REBALANCING ACROSS PEERS

RELATED APPLICATIONS

Any and all applications for which a foreign or domestic priority claim is identified in the Application Data Sheet as filed with the present application are incorporated by reference under 37 CFR § 1.57 and made a part of this specification.

BACKGROUND

Large-scale distributed computing systems include thousands of hosts operating collectively to service requests from an even larger number of remote clients. The systems may be configured in multiple networked clusters of computing systems. A cluster typically has computing systems of similar scale and complementary or similar functionality in operative and communicative mutual connectivity. The computing systems are referred to as peers, or peer nodes. In some cluster configurations, peer nodes store data that may be searched.

BRIEF DESCRIPTION OF THE DRAWINGS

Illustrative examples are described in detail below with reference to the following figures:

FIG. 9 illustrates an example process for bucket rebalancing using bucket search metrics.

DETAILED DESCRIPTION

Distributed computing environments have peer nodes that maintain data for storage, search, and retrieval. To make the data more easily searchable, the related data may be stored in groups called buckets. Millions of such buckets may exist for a large enterprise environment. The amount of data in each bucket may vary between buckets. Thus, general mechanisms to perform load balancing on the peer nodes is based purely on the number of buckets stored on the peer node. However, looking only at the amount of data does not fully address the causes of peer node resource usage. Specifically, the amount of data is a question of storage requirements on the peer node without considering the processing requirements. Some buckets are searched more than other buckets. If a peer node has buckets that are more frequently searched than other peer nodes, the processing requirements of the peer node and therefore the latency to respond to requests may differ as compared to the other peer nodes. In other words, a peer node may be busier in processing requests than other peer nodes even when the peer node stores the same amount or even less than the other peer nodes. Because of the disparity in searching, considering only the number of buckets or the amount of data stored may not adequately reflect the workload of a peer node. Further, considering only the number of buckets overall to the peer node may result in inadequate rebalancing if only less-searched buckets are moved from the peer node.

In general, implementations are directed to bucket rebalancing on peer nodes using bucket search metrics. In particular, one or more implementations capture bucket search metrics for individual buckets on peer nodes. For a particular bucket, the bucket search metrics are measurements of the searches that access the particular bucket. By aggregating the bucket search metrics across the buckets of a peer node, one or more implementations create a meaningful measurement of the degree to which the peer node is implementing search processes. Furthermore, by taking an average of the aggregated bucket search metrics across the peer nodes, implementations are able to differentiate between the peer nodes that are overloaded by implementing many search processes and the peer nodes that are underloaded (i.e., underutilized or available for additional search processes) as compared to the overloaded peer nodes. Using the deviation from the average and the individual bucket search metrics of the buckets, one or more rebalancing of the workload of the peer nodes when moving buckets. Through the rebalancing process, one or more embodiments level the processing of searches performed by the peer nodes.

Figure 1:
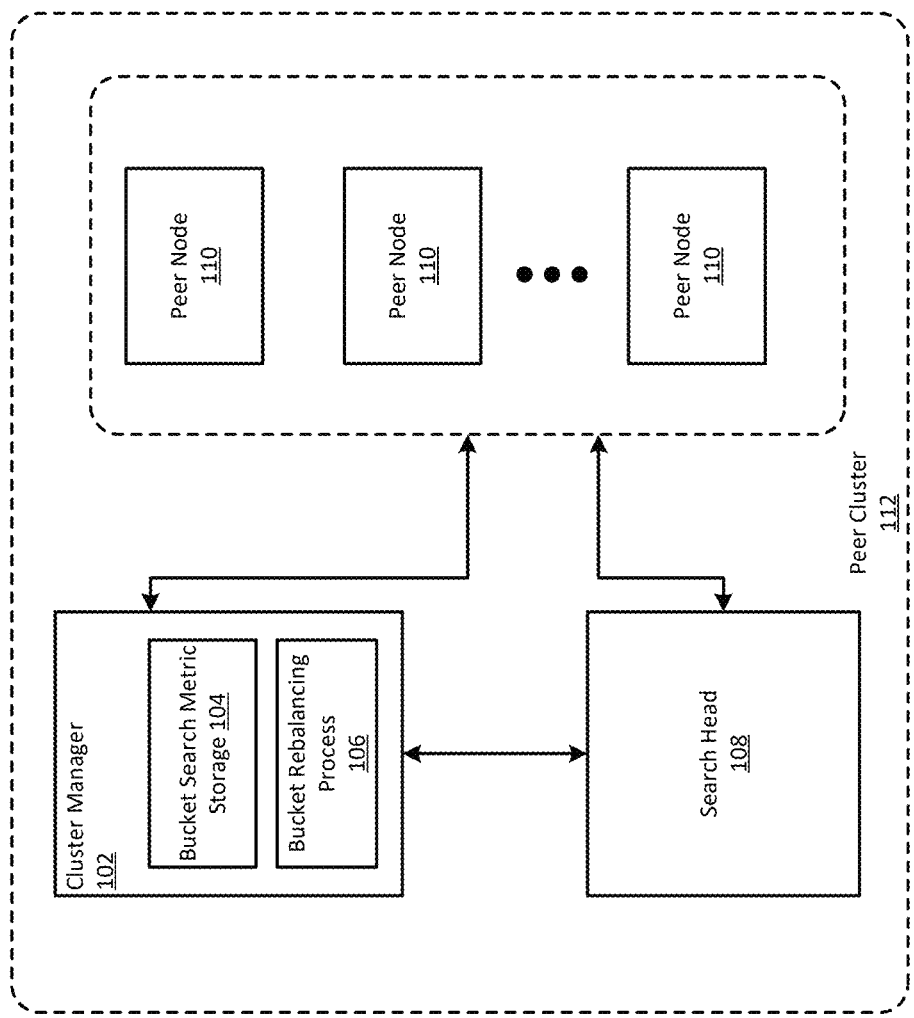
FIG. 1 illustrates an example diagram of a peer cluster.

FIG. 1 illustrates an example diagram of a peer cluster configuration. As shown in FIG. 1, the system 100 includes a cluster manager 102, a search head 108, and multiple peer nodes 110 mutually communicatively and operatively coupled, collectively forming a peer cluster 112. Each of the peer nodes may be implemented as a computing system, a virtual computing system, or a portion thereof. A peer node 110 may have or be allocated a set of hardware computing resources, such as hardware processing resources, memory, and storage. Further, the peer nodes may be replicas with substantively the same hardware computing resources allocated or part of each peer node.

The peer nodes are configured to store buckets. A bucket is a storage structure that holds a single item or multiple items of data. For example, a bucket may have a set of one or more files, be a table structure, or have another structure that maintains a collection of data. The data in the buckets may be records, events, or other information. In one or more embodiments, buckets may be independently managed and stored separate of other buckets. Further, the data in the buckets may have one or more common property values. For example, for buckets that store events, the data within a bucket may be from a same data source or data source type or be from a same time range. The common property values allow for searches for data to be targeted to specific buckets that have data with the searched property values. Namely, rather than searching each bucket, only the buckets with the common property values matching the search are accessed.

Further, buckets may be replicated across multiple peer nodes in the peer cluster 112. The multiple replicas of a bucket provide for recovery from failure of a peer node or the corruption of the data in the bucket. Buckets may be identified as searchable. A searchable bucket is a bucket that has information that assists in searching the bucket. For example, a searchable bucket may have an index that allows the bucket to be searched by searching the index and then obtaining the data from the bucket. Further, in some implementations in which multiple replicas of the same bucket exist, one of the replicas of each particular bucket is designated as a primary. The primary bucket is the bucket that is searched responsive to search queries. By having a single copy of a same bucket be marked as primary, some implementations prevent duplicated data from being returned responsive to a single query. The property of a bucket being searchable and the property of the bucket being primary may be defined in a corresponding searchable flag and primary flag, respectively, stored as part of metadata associated with the bucket.

Each bucket may be related to and identifiable by a corresponding bucket identifier. The bucket identifier is a unique identifier of the bucket. For example, the bucket identifier may be a representation of the common properties of data in the bucket. As another example, the bucket identifier may be an alphanumeric identifier of the bucket. In some implementations, the bucket identifier includes a replica identifier. In other implementations, each replica of a bucket may be associated with the same bucket identifier. In such implementations, the replica may be identified based on a combination of the bucket identifier and the replica identifier.

In some implementations, the peer nodes 110 of the system 100 are indexers. An indexer is configured to store data in buckets with a corresponding index used to search the buckets stored on the peer node. An indexer may be implemented as the indexing system described in reference to FIG. 13, FIG. 14, and FIG. 15, described below.

In addition to the peer nodes 110, the peer cluster 112 includes the cluster manager 102. A peer cluster 112 may have a single cluster manager or multiple cluster managers. The cluster manager 102 coordinates the replicating and balancing activities of the peer nodes 110 and communicates with the search head 108 on the location of data in the buckets. The cluster manager 102 manages the configuration of the peer nodes 110 and orchestrates remedial activities if a peer node 110 goes offline. In the system 100, the cluster manager 102 further includes specific data structures and functionality for the load balancing of the peer nodes. Specifically, the cluster manager 102 includes a bucket search metric storage 104 and a bucket rebalancing process 106.

The bucket search metric storage 104 is a storage structure that maintains bucket search metrics. Each bucket search metric may be defined for an individual corresponding bucket. As such, each bucket search metric may be related in the bucket search metric storage 104 with a bucket identifier of the corresponding bucket. In general, a bucket search metric is a measurement of actual searches performed on a particular bucket. Specifically, the bucket search metric for a bucket is a measure of how the searches are performed that affect a bucket rather than just a measure of the data existing in the bucket. Different types of bucket search metrics may be used without departing from the scope of the claims. For example, the bucket search metric may be a search count, a returned event count, a data amount returned count, a latency to perform a particular search, or other measurement of the searches of the bucket. The search count is a number of searches to the bucket. The returned event count is the number of events from the bucket returned responsive to searches of the bucket. The amount of data returned count is an aggregation of the number of bytes of data returned responsive to searches of the bucket. The latency is the amount of time that the peer node uses to perform the searches of the particular bucket. The bucket search metric may be degraded in the bucket search metric storage so that current searches of a bucket have greater weight than previous searches. The degradation decays the existing bucket search metrics over time.

Continuing with FIG. 1, the cluster manager 102 further includes a bucket rebalancing process 106. The bucket rebalancing process 106 is configured to obtain the bucket search metrics from the bucket search metric storage 104 and rebalance the search processing of buckets amongst the peer nodes 110. In one or more implementations, the rebalancing process redistributes the buckets such that the bucket search metrics of the buckets on the peer nodes are even, or substantially close to an even distribution of search metrics.

The system 100 may further include a search head 108. The search head 108 is configured to send queries to the various peer nodes 110. The queries may include a search request and optionally additional processing based on the search request. For example, the query may be a request to return data having one or more properties that is directly stored in one or more buckets. In another example, the query may be for an aggregation of data matching one or more properties stored in one or more buckets. If the query is for an aggregation of data, the query may involve a search function to search for the data and an aggregation function to aggregate the data. Aggregating the data may be to link the data, concatenate the data, obtain statistics about the data, or perform another action in which the data is combined. In one or more implementations, the search head 108 is configured to identify the peer nodes having the data and send the queries to the data. Further, the search head 108 may be configured to trigger the query (e.g., based on a timer and schedule) or receive a query (e.g., an ad hoc query). Other triggers for the query to the peer nodes may exist without departing from the scope of the claims. In some implementations, the peer cluster 112 may include multiple search heads 108. In some embodiments, the search head 108 may be implemented as described in reference to FIG. 14 and FIG. 15.

Figure 2:
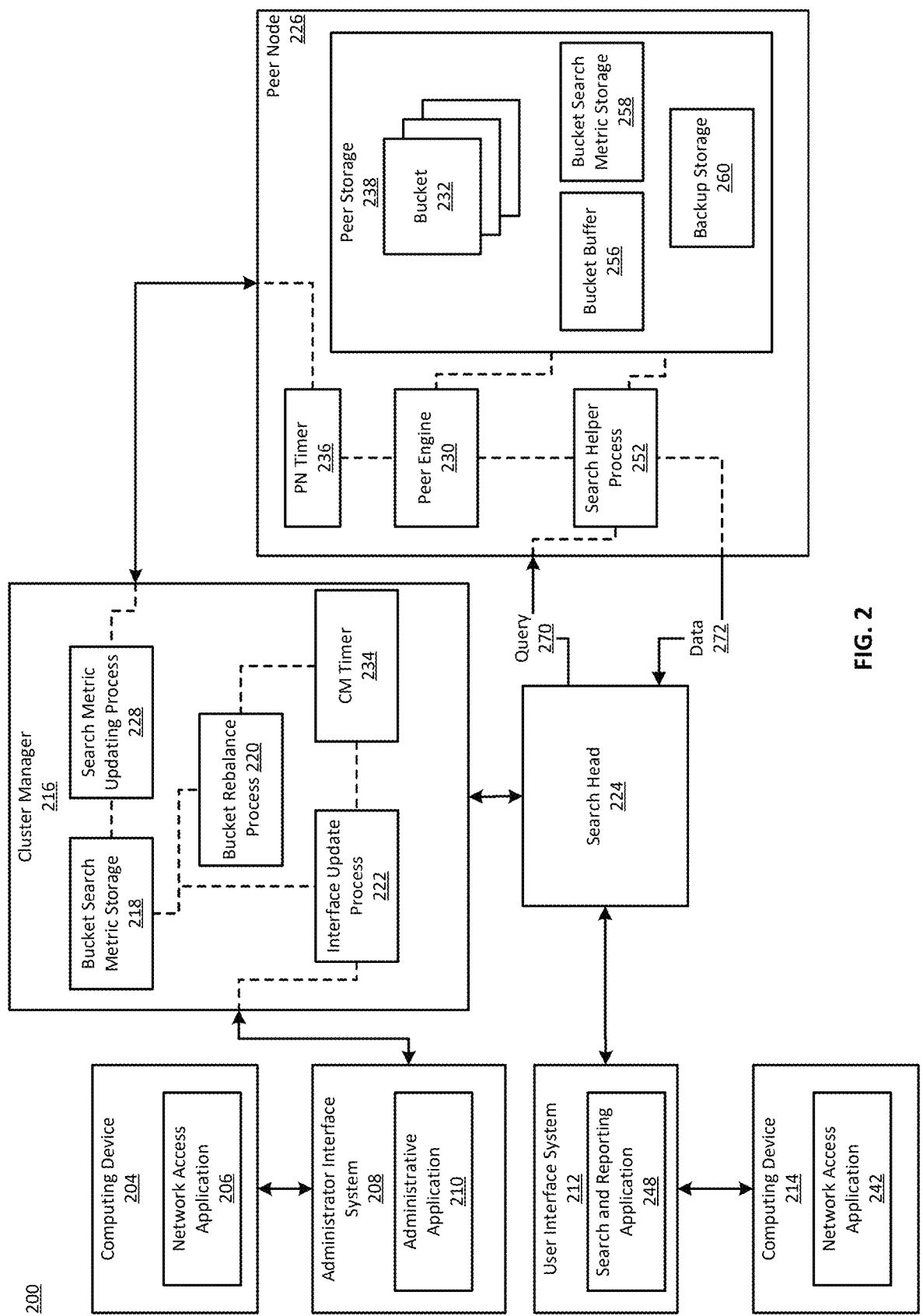
FIG. 2 illustrates an example diagram of a portion of a peer cluster for recovering corrupt buckets.

FIG. 2 is a diagram illustrating a portion of the peer cluster components, data structures and request originators of a bucket recovery operation. FIG. 2 shows a cluster manager 216, a search head 224 and a peer node 226 of a peer cluster. The cluster manager 216 and the search head 224 are the same as the like-named components described above in FIG. 1. The peer node 226 is representative of multiple peer nodes of the peer cluster shown in FIG. 1. Namely, although a single peer node 226 is shown, the peer cluster may include multiple peer nodes that have the components of peer node 226. The cluster manager 216 is communicatively coupled to an administrator interface system 208. The administrator interface system 208 is operably and communicably coupled to a computing device 204.

The computing device 204 and administrator interface system 208 may be the same or similar to computing devices that are configured to communicate with a user, such as a search system administrator. The administrator interface system 208 includes an administrative application 210. The administrative application 210 is a software application that is configured to obtain the current load balance of the peers, the execution status of the peers, and generate reports. The administrative application 210 may be the same or similar to the monitoring console described in reference to FIG. 14.

In one or more embodiments, the administrative application 210 that is available through the administrator interface system 208 is configured to send a request that initiates a bucket rebalancing to the cluster manager 216. The administrative application 210 may be connected to a network access application 206 executing on a computing device 204. The network access application 206 may have an interface for an administrator to input the request. For example, the network access application 206 may have a search field provided by the administrative application 210. For example, an administrator may input the request into a search field and the administrative application 210 may send a request to the cluster manager via Representational State Transfer (REST) calls, Hypertext Transfer Protocol (HTTP) requests, application programming interface (API) calls, a command line instruction (CLI), or a Web User Interface (Web UI) call.

In one or more implementations, the administrative application 210 may include the functionality of the user interface system 212 executing on the computing device 214. In one or more alternative implementations, the user interface system 212 and search and reporting application 248 may respectively include the functionality of the administrator interface system 208 and the administrative application 210.

Figure 14:
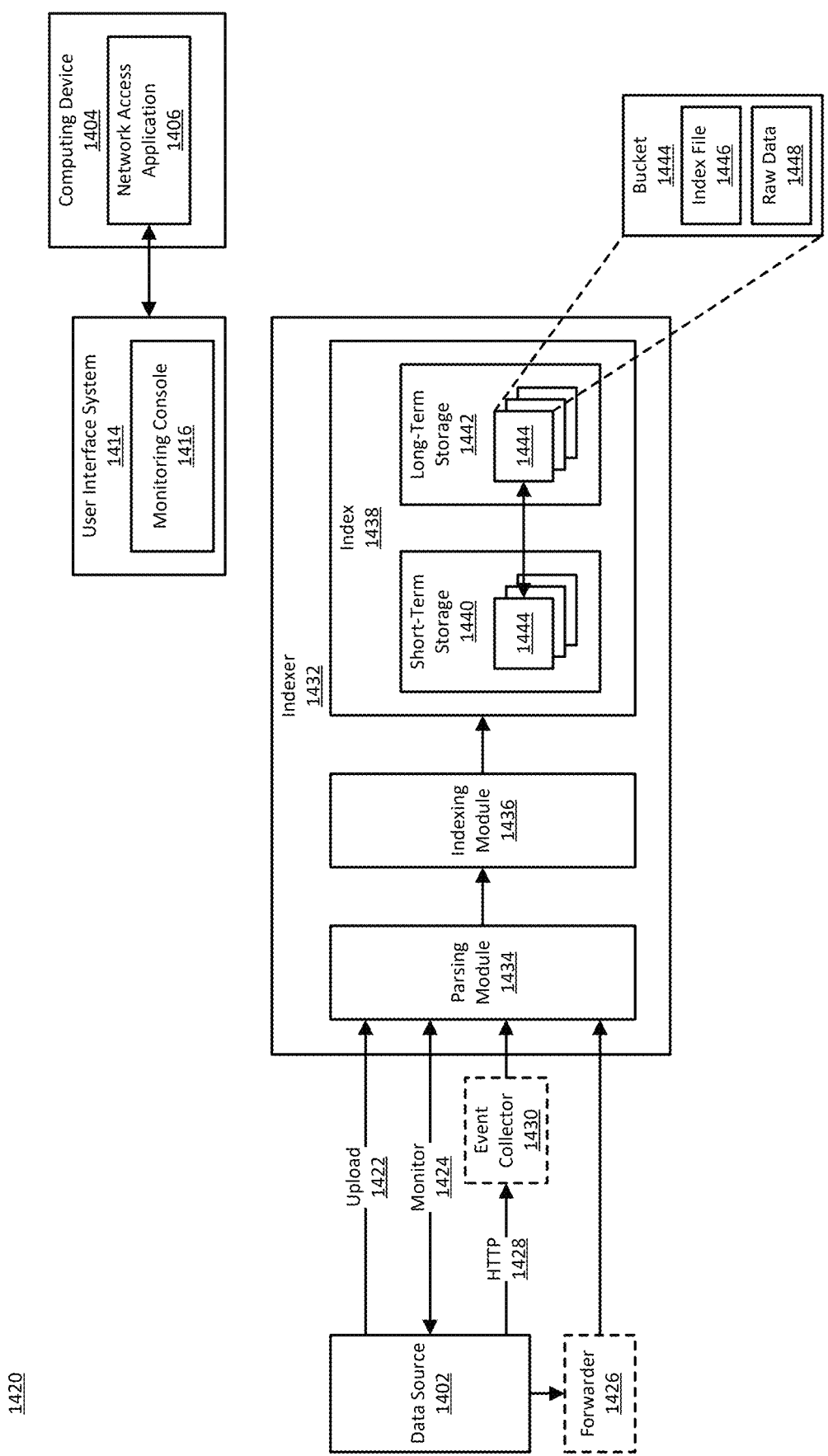
FIG. 14 illustrates an example implementation architecture diagram of a data intake and query system that ingests data.

The user interface system 212 and the search and reporting application 248 may be the same or similar to the like-named components described in reference to FIG. 14. The computing device 214 and the network access application 242 are the same or similar to the like-named components described in reference to FIG. 14. For example, the search head 224 may be configured to receive a search query from the search and reporting application 248 executed by the user interface system 212. The search head 224 is configured to send the query 270 to the peer node and receives one or more data 272 as the search result. The data 272 may be aggregated data or raw data stored in the buckets 232. For example, the data may be events, such as described below in reference to FIG. 15, FIG. 14, and FIG. 15. Generally, an event is a record of an action or occurrence by software and is associated with a timestamp identifying the time of the action or occurrence. For example, the event may be raw machine data associated with a timestamp.

Continuing with FIG. 2, the cluster manager 216 may be the same or similar to the cluster manager described above with reference to FIG. 1. In the configuration shown in FIG. 2, the cluster manager 216 is configured to obtain the bucket search metrics from the peer nodes (e.g., peer node 226). In one or more other implementations, the bucket search metrics may be obtained from the search head 224. The cluster manager 216 may include the bucket search metric storage 218, the bucket rebalance process 220, an interface update process 222, a search metric updating process 228, and a cluster ma timer (cm timer) 234. The bucket search metric storage 218 and the bucket rebalance process 220 may be the same as the like-named components of FIG. 1.

The interface update process 222 is configured to update a user interface based on the execution of the peer nodes (e.g., peer node 226). For example, the interface update process 222 may be configured to present which peer nodes are executing, statistics about the execution, and the search load of the peer nodes with respect to each other. For example, the interface update process 222 may be configured to display a histogram of aggregated bucket search metrics across the peer nodes. As another example, the interface update process 222 may further be configured to show the individual bucket search metrics of an individual bucket. The search metric updating process 228 is configured to obtain new bucket search metrics from the peer nodes and update the buffer search metrics in the buffer search metric storage. In one or more implementations, the search metric updating process 228 only obtains new bucket search metrics for buckets that have updated search metrics. Further, in some implementations, only the updates to the bucket search metrics are obtained. In one or more implementations, the search metric updating process is configured to update the bucket search metrics such that, across the buckets, more recent searches have greater weight than less recent searches. As such, the search metric updating process 228 may be configured to apply a weighting function when updating the bucket search metrics. An example of a weighting function is an exponential decay function. However, other weighting functions may be used without departing from the scope of the claims.

The cm timer 234 is a software timer configured to trigger the bucket rebalancing process 220. For example, so as to not have continual movement of buckets, the bucket rebalancing process 220 may be triggered at a predefined time interval. The cm timer 234 is configured to track the lapse time and trigger the bucket rebalancing process 220 when the current time period of the length of the predefined time interval expires.

The peer node 226 of FIG. 2 shows components and data structures within the peer node for searching and performing a rebalancing of buckets. The peer node 226 includes a search helper process 252, a peer engine 230, and a peer node timer (PN timer 236). The search helper process 252 is configured to perform a search of the buckets on the peer node using the peer storage 238. Specifically, when a query 270 is received by the peer node 226, the search helper process 252 processes the query to identify the buckets having data that is used by the query, searches the buckets, performs any aggregation actions, and provides data to the search head 224. The search helper process 252 may also be configured to trigger the peer engine 230 with the bucket search metrics of the buckets that are searched. If the bucket search metrics are a search count, then the search helper process 252 may be configured to send a bucket identifier of each searched bucket to the peer engine 230. If the bucket search metrics includes additional information, the search helper process 252 may be configured to track the additional bucket search metrics (e.g., by starting and stopping respective timers in the case of latency).

The peer engine 230 is configured to manage the processes operating on the peer node 226. Further, the peer engine 230 is configured to maintain and track bucket search metrics. For example, the peer engine 230 may be configured to update the peer storage 238 based on the bucket search metrics.

A peer node timer (PN timer) 236 is a software timer configured to trigger the transmission of the bucket search metrics of the buckets to the cluster manager 216. For example, so as to not have continual updating of bucket search metrics on the cluster manager 216 and therefore overuse network bandwidth, the PN timer 236 may trigger at a predefined time interval. Thus, the PN timer 236 is configured to track the lapse time and trigger the transmission when the current time period expires.

The peer node 226 includes peer storage 238. The peer storage 238 directly stores buckets 232. The peer storage 238 may be multiple storage systems provided by a third-party storage vendor. The multiple storage systems may be from different vendors and may be heterogeneous. The heterogeneous storage systems may have heterogeneous protocols and interfaces for storing data on the storage system(s) of the peer storage 238. Some of the storage systems may be from the same vendor and of the same type. Further, some of the storage systems may have the same or overlapping physical devices. The actual physical device and underlying storage may be abstracted from the peer node. The peer storage 238 includes multiple buckets 232, a bucket buffer 256, a bucket search metric storage 258, and a backup storage 260. The buckets 232 are the same as described above with reference to FIG. 1.

The bucket buffer 256 is a temporary storage space that stores bucket identifiers of buckets searched in a current time period. Specifically, the bucket buffer 256 tracks which buckets have new bucket search metrics stored. The backup storage 260 is storage for the bucket search metrics. In one or more embodiments, the backup storage 260 may be long term storage for the bucket search metrics. The bucket search metric storage 258 stores bucket search metrics. The bucket search metric storage 258 may store current values of bucket search metrics, including historical bucket search metrics or may store the new bucket search metrics. Each bucket search metric in the bucket search metric storage 258 may be associated with a bucket identifier of the respective bucket. The association or relationship may be explicit, such as through linked identifiers or implicit, such as based on position.

Figure 3:
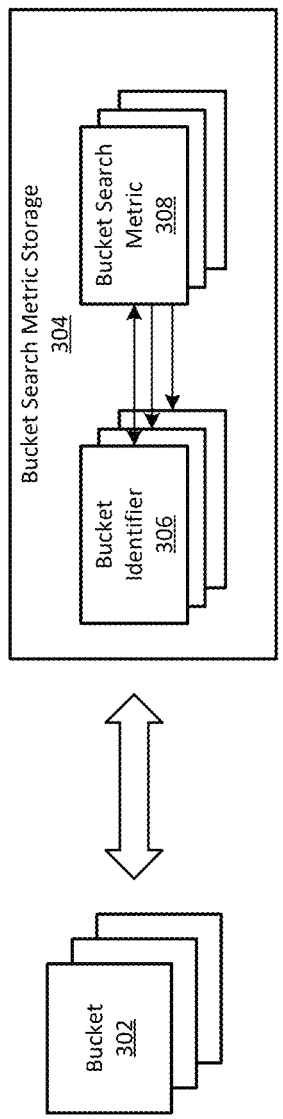
FIG. 3 illustrates an example diagram of a peer storage corresponding to a peer node.
Figure 6:
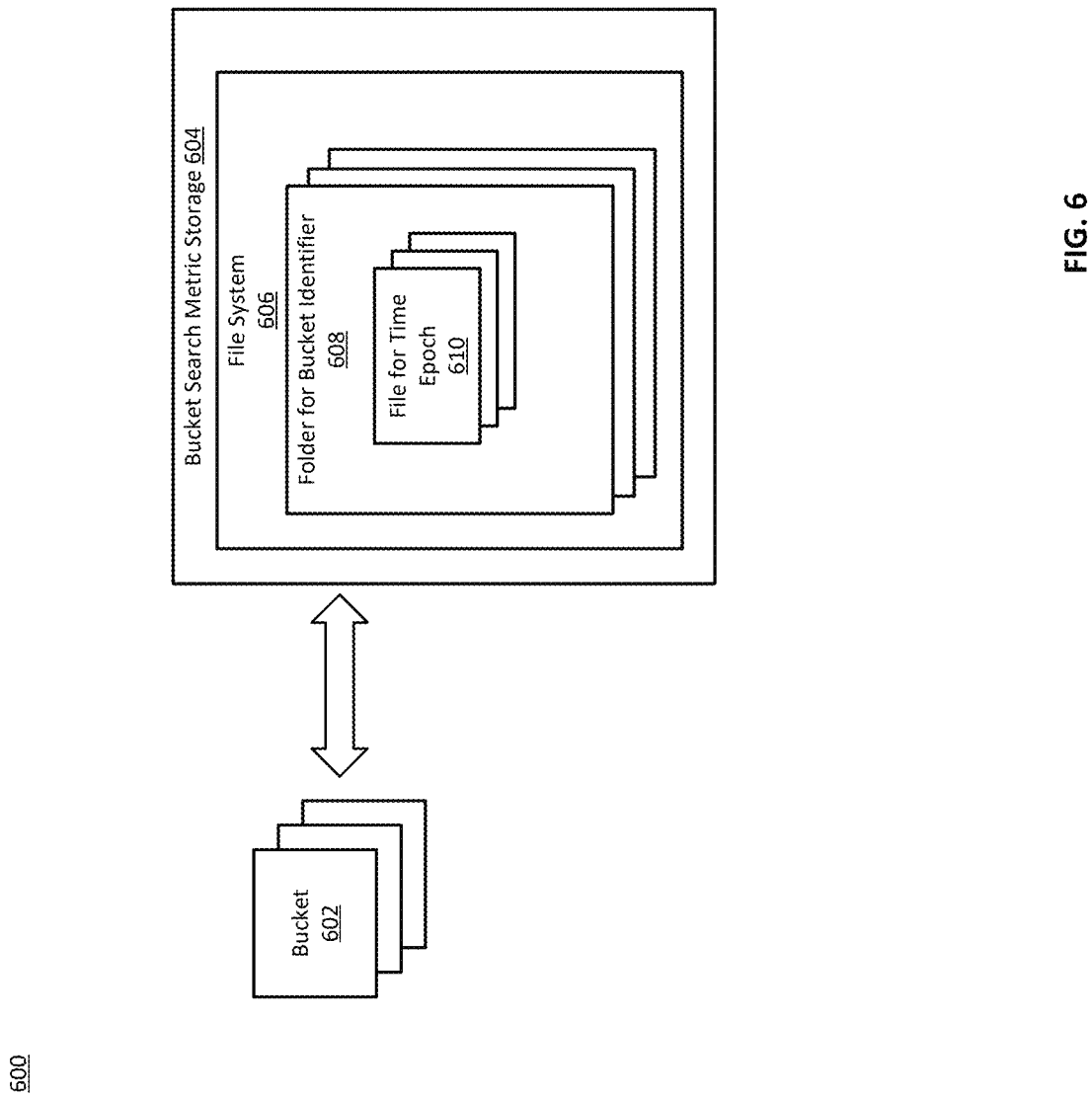
FIG. 6 illustrates an example diagram of a peer storage corresponding to a peer node.

Different techniques may be used to store bucket search metrics. FIG. 3 and FIG. 6 show possible ways in which the bucket search metrics may be stored. Other ways may be used without departing from the scope of the claims.

FIG. 3 illustrates an example diagram of a peer storage corresponding to a peer node that includes the bucket search metric storage. In the example of FIG. 3, the bucket search metric 308 is based on a search count. Although not shown in FIG. 3, each bucket search metric may be associated with a corresponding timestep. The timestamp may be a time when the bucket search metric is calculated, received, recorded, etc. In the diagram of FIG. 3, the buckets 302 are the same as described above in reference to FIG. 1 and FIG. 2. The bucket search metric storage 304 relates a bucket identifier 306 of a respective bucket to a stored bucket search metric 308. For example, the bucket search metric storage 304 may be a table with bucket identifiers 306 of buckets searched in the current time period related to the corresponding bucket search metric of the bucket 308 as measured by a search count. As another example, the bucket search metric storage 304 may be an array where each position in the array corresponds to a particular bucket. In such a scenario, the position is the bucket identifier associated with the bucket.

In the implementation of FIG. 3, the backup storage (shown in FIG. 2), may have a similar structure to FIG. 3, and include a storage location for each bucket search metric. Further, the backup storage may include one or more historical bucket search metrics for each bucket 302. A historical bucket search metric is a bucket search metric that is not for the current time period. The bucket search metric backup file may be named using an epoch timestamp. The bucket search metric storage performs the backup process in the embodiment of FIG. 3.

Figure 4:
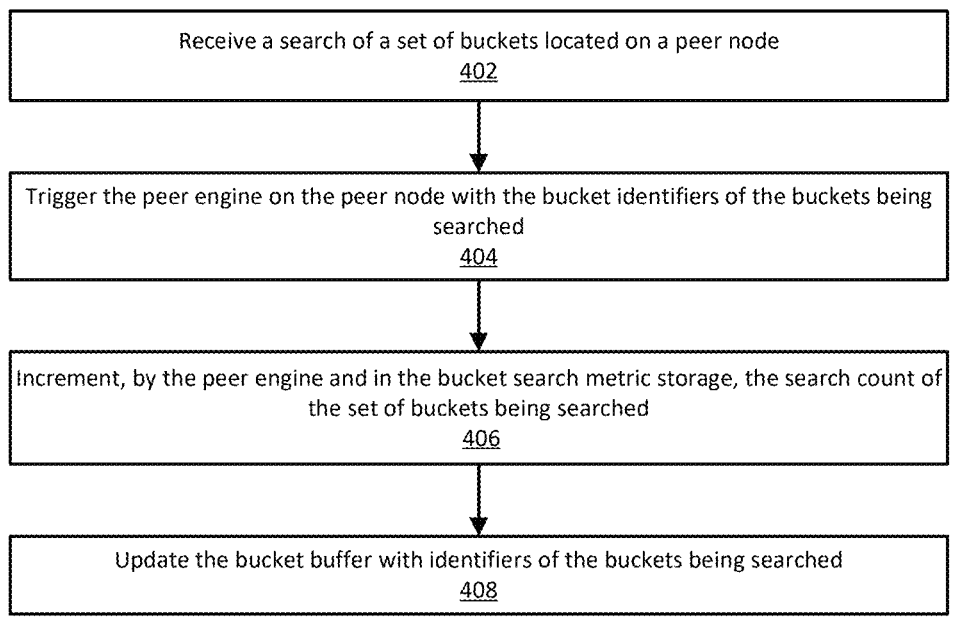
FIG. 4 illustrates an example process for tracking searches to buckets in a peer cluster.
Figure 5:
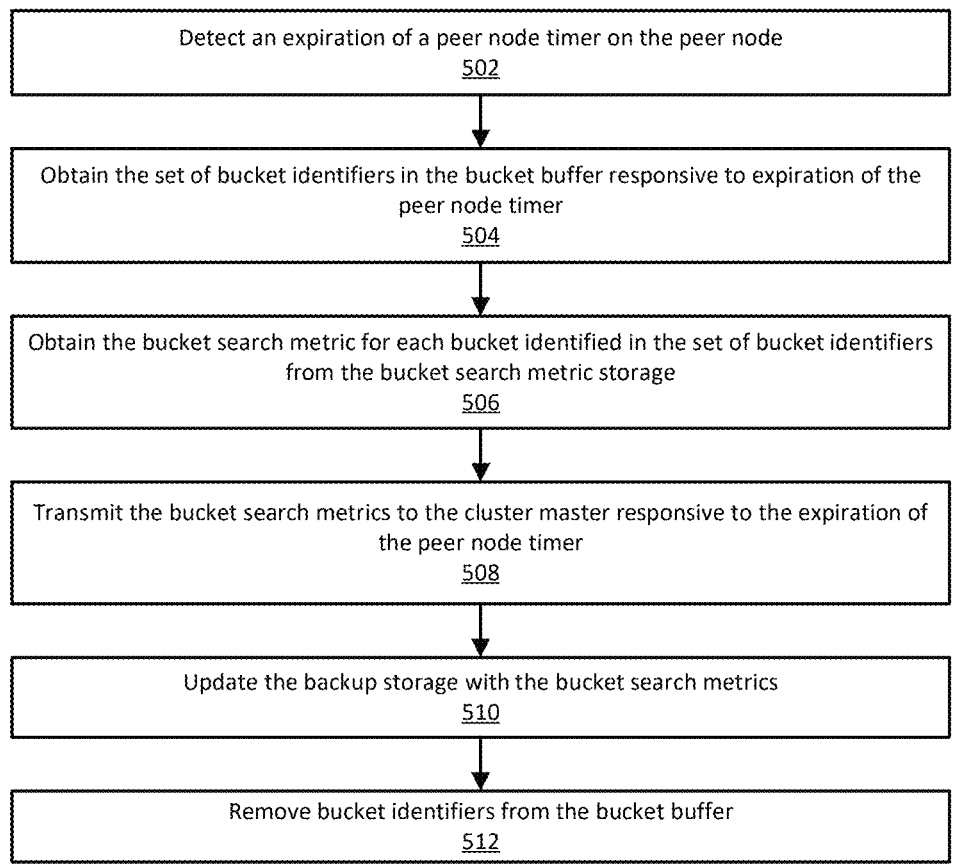
FIG. 5 illustrates an example process for transmitting bucket search metrics to a peer node.

FIG. 4 illustrates an example process 400 for tracking searches to buckets in a peer cluster. FIG. 5 shows a flowchart for transmitting bucket search metrics to the cluster manager. While the various blocks in these flowcharts are presented and described sequentially, at least some of the blocks may be executed in different orders, may be combined or omitted, and at least some of the blocks may be executed in parallel. Furthermore, the steps may be performed actively or passively.

Turning to FIG. 4, in Block 402, a search of a set of buckets located on a peer node is received. A search head receives or triggers a query that includes the search. The search helper process receives a query from the search head. Responsive to the query, the search helper process determines a set of buckets that include data for responding to the query. The set of buckets being searched includes one or more buckets having the data that is searched. For example, the search helper process may identify one or more buckets having data requested to be returned by the query or is used in identifying other data that is responsive. The search helper process then searches the identified buckets and returns the data responsive to the query.

In Block 404, the search helper process triggers, responsive to the search, the peer engine on the peer node with the bucket identifiers of the set of buckets being searched. Before, during, or after, searching the buckets and/or returning the data, the search helper process also triggers the peer engine. The triggering includes the bucket identifiers of the set of buckets that are searched by the query.

In Block 406, the peer engine increments the search count of the set of buckets being searched in the bucket search metric storage. For each bucket in the set of buckets, the search count associated with the bucket identifier is incremented by one responsive to the search of the bucket and the triggering by the search helper process. Because multiple queries may be processed at the same time by the indexer and multiple instances of search helper processes and peer engines may exist on the same peer node, incrementing the search count may include obtaining a lock, such as a mutex, on the bucket search metric storage location having the respective search count and incrementing the search count only after the lock is obtained. For example, if two threads attempt to update the search count concurrently without each thread first obtaining a lock, the search count may be updated once instead of twice (i.e., both threads increment only the initial value by one).

Although Block 406 describes incrementing search counts, other types of bucket search metrics may be stored in the bucket search metric storage. For example, the search helper process, peer engine, or other monitoring process may acquire bucket search metrics for each bucket searched by monitoring the search of the respective buckets in the set of buckets. The peer engine may then update the bucket search metric based on the monitoring of the search. For example, starting and stopping a timer associated with a bucket may be used to identify the length of time to search the bucket. The length of time may be added to a length of time already stored for the bucket search metric in the bucket search metric storage. Other types of bucket search metrics may be similarly stored in bucket search metric storage.

In one or more implementations, when a bucket search metric is updated, degradation is performed. For example, when the bucket search metric value is read, the decayed value may be calculated using the existing timestep. By way of a more specific example, a decay for the existing bucket search metric value may be calculated according to the existing timestamp, then the new search value is added, and the timestamp of the value set to reference the current time.

The process of calculating a decay of stored bucket search metrics is described in reference to FIG. 9.

In Block 408, the bucket buffer is updated with identifiers of the buckets being searched. If the bucket identifiers of each bucket in the set of buckets is not in the bucket buffer, then the bucket identifiers of the buckets in the set of buckets that are missing from the bucket buffer are added to the bucket buffer. Specifically, because the bucket buffer maintains a set of bucket identifiers that have a search count incremented in the current time period, the bucket buffer is updated, responsive to the search count being incremented to include the bucket identifiers of any buckets not currently listed and that have an incremented search count.

The processing of FIG. 4 is that processes can identify which bucket identifiers are associated with new values in the current time period using the bucket buffer and obtain the new values generated during the current time period from the bucket search metric storage. FIG. 5 illustrates an example process 500 for transmitting bucket search metrics to a peer node using the processing of FIG. 4 and the storage of FIG. 3.

In Block 502, an expiration of the peer node timer on the peer node is detected. The peer node timer triggers at the expiration of the predefined time period. For example, the peer node timer may trigger every ten minutes. The length of the predefined time period may be configurable and dependent on the number of searches and overall operations of the cluster.

In Block 504, a set of bucket identifiers in the bucket buffer is obtained responsive to expiration of the peer node timer. The bucket buffer is read to identify each of at least a subset of bucket identifiers listed in the bucket buffer. The listed bucket identifiers identify the set of buckets that have bucket search metrics that are updated in the current time period. In one or more implementations, the listed bucket identifiers in the subset are limited to a maximum number. For example, if the bucket buffer has 2050 bucket identifiers, and the maximum number is 2048, then 2048 bucket identifiers may be obtained and removed in a first round of transmission triggered by the PN timer while the remaining 2 will wait until the PN timer triggers for the next round.

In Block 506, the bucket search metric is obtained for each bucket identified in the set of bucket identifiers in the search metric storage. Specifically, for each bucket identifier, the bucket search metric storage is read to obtain the new bucket search metric. As described above, the peer node stores the bucket search metrics with a corresponding timestamp. The buckets search metrics may be decayed using the process described in FIG. 9 before sending. When the cluster master receives the bucket search metrics described below, the cluster master may store the received bucket search metrics with the timestamp. The timestep may be the time in which the bucket search metrics are sent or the time in which the bucket search metrics are received.

In Block 508, the bucket search metrics are transmitted to the cluster manager responsive to the expiration of the peer node timer. In one or more implementations, the bucket search metrics that are transmitted are the new or updated bucket search metrics. For example, the new bucket search metrics may be transmitted using messages, shared memory, or any other communication protocol.

In Block 510, the backup storage on the peer node is updated with the bucket search metrics. The updating to backup storage may directly store the bucket search metrics in the backup storage. As another example, the historical bucket search metric for a bucket may be aggregated with a new bucket search metric. In one or more implementations, the aggregation is a weighted aggregation so that the new bucket search metric has greater value. For example, one type of weight aggregation may be to multiply the bucket search metrics by respective weights. Another type of weighted aggregation may be to perform exponential decay of the historical bucket search metric.

To perform the update based on exponential decay, the historical bucket search metric for a particular bucket is obtained from the backup storage. The exponential decay of the historical bucket search metric based on a length of a time period since a last update of the historical bucket search metric. For example, if the bucket search metric is updated in backup storage at each trigger of the peer node timer, then the length of time is the length of time set forth in the peer node timer. Calculating the exponential decay is performed by multiplying the historical bucket search metric by a constant raised to the power of the length of time to obtain the current value for the historical bucket search metric. The constant is a value between zero and one, whereby the value of the constant may be a configurable parameter. In mathematical notation, the current value of the historical bucket search metric is $C^T \cdot H$, where H is the historical value of the bucket search metric stored in the backup storage with the bucket identifier, C is the constant, and T is the length of time. After the current value for the historical bucket search metric is obtained, the current value may be added to the new bucket search metric (obtained in Block 506) to obtain the bucket search metric for the bucket. The resulting bucket search metric replaces the historical bucket search metric in the backup storage. By using exponential decay, the new bucket search metric has greater weight than the historical bucket search metric. Thus, a bucket that was once searched many times, but now is less often searched is reflected as such when balancing the work performed by the peer nodes.

The process of calculating exponential decay may be performed for each historical bucket search metric in the bucket buffer at each expiration of the peer node timer. In such a scenario, the same T value is used to update each bucket search metric, including those that are not updated in the current time period.

Alternatively, only the buckets that have new bucket search metrics have the historical bucket search metrics updated. In such a scenario, each bucket having a bucket search metric in backup storage may also be associated with an individual stored timestamp. The stored timestamp may record the time of the last update of a particular bucket's bucket search metric. Subtracting a current timestamp from the stored timestamp results in a value for T in the exponential decay function. Stated another way, in the exponential decay function, $C^T \cdot H$, where H is the historical value of the bucket search metric stored in the backup storage with the bucket identifier, C is the constant, and T is the current timestamp minus the stored timestamp for the particular bucket. When replacing the historical bucket search metric with the bucket search metric after the update, the stored timestamp associated with the bucket is also replaced with the current timestamp.

In Block 512, the bucket identifiers of the at least the subset of bucket identifiers obtained in Block 504 are removed from the bucket buffer. The bucket buffer may be implemented as a queue (e.g., first in first out queue). Thus, as a bucket identifier is obtained from the queue, the bucket identifier may be removed from the queue. In other implementations, all bucket identifiers may be removed, and bucket search metrics sent, in which all bucket identifiers are removed. Because the bucket buffer on the peer nodes reflects the buckets which have updated bucket search metrics not yet sent to the cluster master, the start of the new time period changes both to indicate no bucket search metrics for the bucket search metric storage and no bucket identifiers in the bucket buffer. The next time period starts and the processing repeats with FIG. 4 and FIG. 5.

The storage of FIG. 3 along with the processing of FIG. 4 and FIG. 5 have the attributes that a lock is obtained each time the bucket search metric is updated. Further, backup storage is explicitly updated by the peer node. Another way is to use the file system. Although using the file system may cause the generation of multiple files that appear empty or limited in content, the use of the file system may also allow the operating system to manage the backup. Further, locks to perform the update may not be needed as explained below.

FIG. 6 illustrates an example diagram of a peer storage corresponding to a peer node using a file system for storage. The technique of FIG. 6 for bucket search metric storage uses the property that each identical character in a file has a constant number of bytes. Namely, the number of bytes to represent a particular character does not change depending on the position of the character. As such, if the file does not have other contents, a file size of a file may be used as the search count when the same additional character is appended to the file for each search. In one or more implementations, the character is a new line character that is one byte. Thus, adding a new line character for each new search adds one byte to the file. In such a scenario, the file size, in bytes, of a file defined for a particular bucket is the search count of the bucket. Other one-byte characters may be used without departing from the scope of the claims. Moreover, with some simple modifications, other characters may be used without departing from the scope of the claims.

Turning to the implementation of FIG. 6, the buckets 602 are the buckets described above with reference to FIG. 1 and FIG. 2. The bucket search metric storage 604 stores a file system 606. The term file system corresponds to the standard definition used in the art of computers. The file system maintains a directory structure of files. Specifically, the file system 606 includes multiple folders for bucket identifier 608. Each folder corresponds to an individual bucket 602. Thus, a folder is related to or has a folder name of the bucket identifier of the corresponding bucket. Although not shown in FIG. 6, the folders may be subfolders of other folders, such as in the case of grouping buckets based on common properties. In such a case, the folders for buckets in the same grouping may be subfolders of another folder for the grouping. Further, although not shown in FIG. 6, a folder for a bucket may have subfolders, such as for different spans of time.

A folder for a particular bucket identifier 608 includes one or more files for time epoch 610. Each file for time epoch 610 is defined with a particular time epoch for the bucket. A time epoch is a span of time having a predefined length. The length of the time epoch may be the same as the time period or less than the time period of sending bucket search metrics to the cluster manager. For example, multiple time epochs may be in the same time period. By way of a more specific example, the time span of a time epoch may be 60 seconds, and the time period may be every thirty minutes.

In one or more implementations, the file name of a file for time epoch 610 includes an identifier of the time epoch. Thus, the file name identifies the time epoch to which the file relates. The current time epoch is for the most recent file that is currently being updated when new searches are received. For example, the file name may be at least one of a start timestamp and an end timestamp of the time epoch. The file name may be in epoch time standard format (e.g., number of seconds since 00:00:00 UTC on 1 Jan. 1970). The file contents have the identical characters, whereby the number of identical characters corresponds to the number of recorded searches during the time period.

Figure 7:
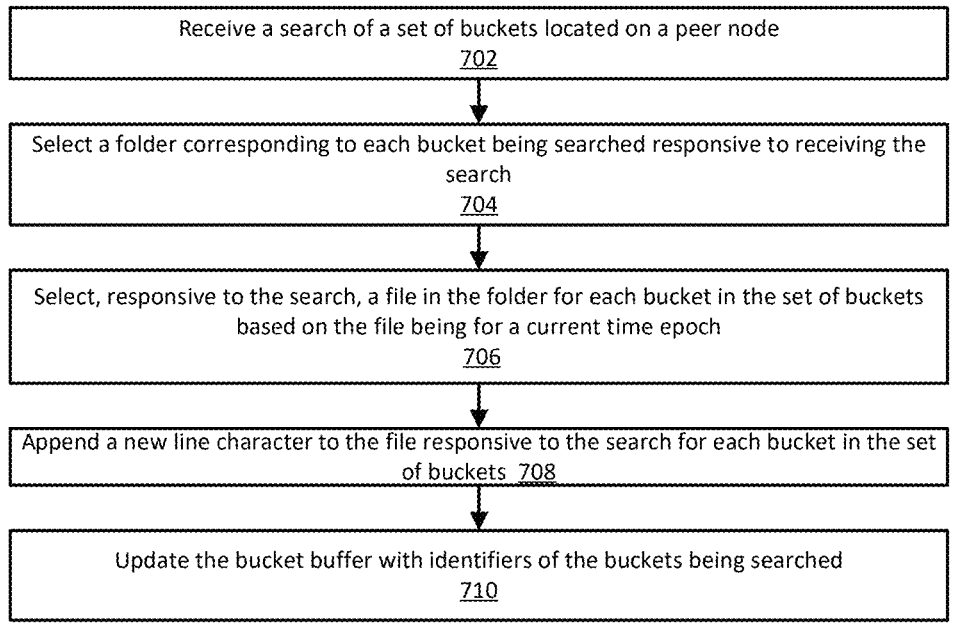
FIG. 7 illustrates an example process for tracking searches to buckets using a file system in a peer cluster.

FIG. 7 shows a flowchart 700 for storing search counts. In Block 702, a search of a set of buckets located on a peer node is received. Receiving the search may be performed in a same or similar manner to Block 402 of FIG. 4. In one or more implementations, the peer engine may also be triggered as described in Block 404 of FIG. 4. In such implementations, the operations may be performed by the peer engine.

In Block 704, a folder corresponding to each bucket being searched is selected responsive to receiving the search. For each bucket in the set of buckets being searched, the following operations may be performed. The file system may be traversed for the bucket to identify the folder having the files of the bucket. For example, the folder name may be a bucket identifier of the bucket. Then Block 706 may be performed for each bucket in the set of buckets being searched.

In Block 706, responsive to the search, a file in the folder for each bucket in the set of buckets is selected based on the file being for a corresponding time epoch. A file is for the current time epoch when the file references or otherwise may include bucket search metrics for the current time epoch. In one or more implementations, the file name of the file identifies the current time epoch. In such a scenario, the file is selected based on the file having the file name identifying the current time epoch or being identifying a time epoch that is within a threshold to the current time epoch. Determining the current time epoch may be based on the current time epoch having a current time value. The current time value may be a timestamp when the search is received, when the peer engine is triggered, when the file is identified, etc. If a file for the current time epoch does not exist for the bucket, a file may be created.

In Block 708, a new line character is appended to the file responsive to the search for each bucket in the set of buckets. The character being a new line character is used because the new line character is a byte. However, other one byte size characters may also be used without departing from the scope of the claims. Further, as long as the character has an identical size, different characters may be used. If the selected identical size characters are greater than one byte, determining the number of updates may be performed by dividing the file size by the number of bytes of the identical sized characters. Because a character is appended to the file and the file size is used to determine the number of updates, the order of appending characters does not matter. Therefore, a lock does not need to be obtained in some implementations to add the new line character when multiple searches are being concurrently performed.

In Block 710, the bucket buffer is updated with identifiers of the buckets being searched. Updating the bucket buffer may be performed as described above with reference to Block 408 of FIG. 4.

Figure 8:
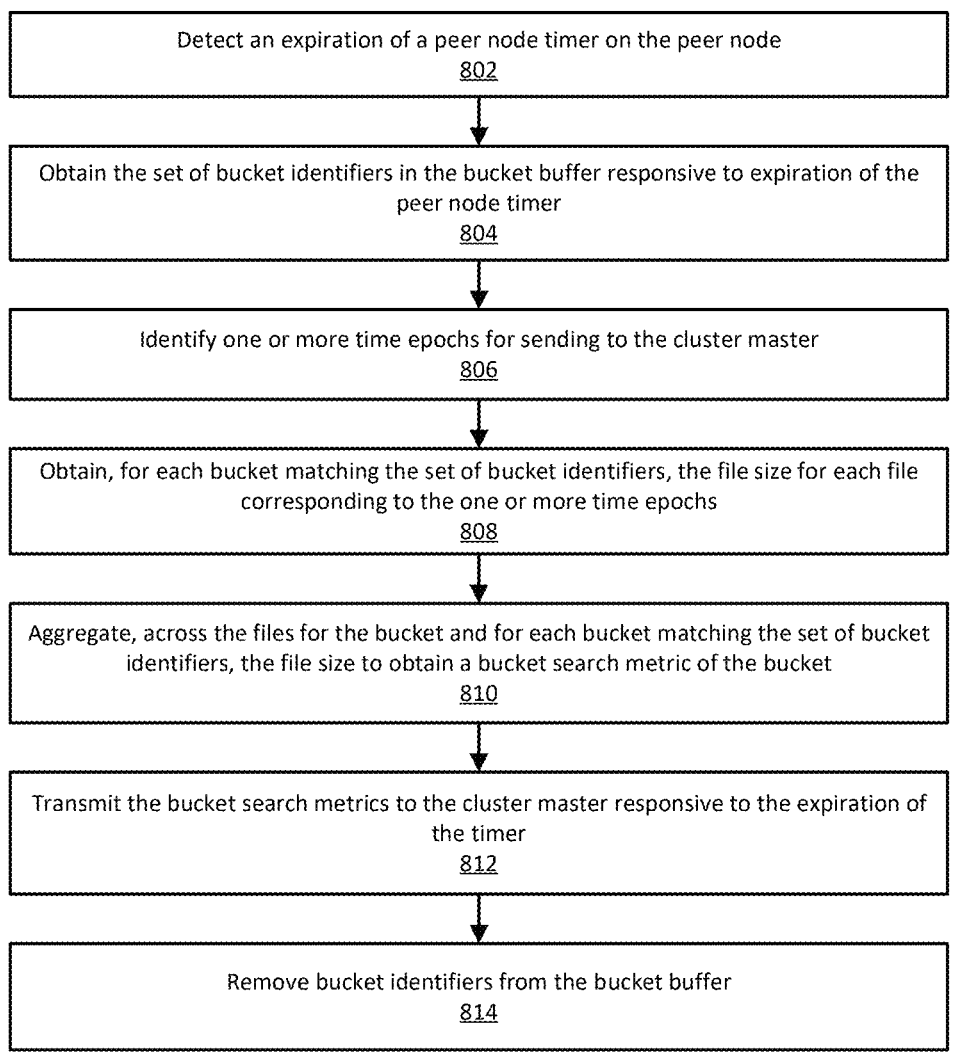
FIG. 8 illustrates an example process for transmitting bucket search metrics from the file system to a peer node.

The processing of FIG. 7 results in files having a file size indicative of the search count for each bucket and a bucket buffer that indicates which buckets have updated files. FIG. 8 shows a flowchart 800 for transmitting the current bucket search metrics when the bucket search metric is a search count stored in a file.

In Block 802, an expiration of a peer node timer on the peer node is detected. Detecting expiration of the timer may be performed as described above with reference to Block 502 of FIG. 5.

In Block 804, the set of bucket identifiers in the bucket buffer is obtained responsive to the expiration of the peer node timer. Block 804 may be performed in a same or similar technique as described above with reference to Block 504 of FIG. 5.

In Block 806, one or more time epochs for sending to the cluster manager is identified. In one or more implementations, all of the files corresponding to all of the time epochs on disk are read each time search metrics are sent to cluster master for the buckets obtained from the bucket buffer. In other implementations, a subset of files corresponding to a subset of time epochs may be sent. The subset of time epochs is determined based on the time of the last transmission to the cluster manager. Any time epochs between the current time and the last transmission are identified as possibly having bucket search metrics that are updated.

In Block 808, for each bucket matching the set of bucket identifiers, the file size corresponding to the one or more time epochs is obtained. For each time epoch and each bucket identifier in the set of identifiers, the files corresponding to the time epoch and bucket identifier are identified from the file system. The file size may be directly read from the metadata associated with the file. The process of FIG. 8 is performed for each time epoch and bucket identifier.

In Block 810, across the files for the bucket and for each bucket matching the set of bucket identifiers, the file size is aggregated to obtain a bucket search metric of the bucket. Independently for each bucket identifier in the set of bucket identifiers, the file sizes of the files corresponding to the one or more time epochs are aggregated. The file sizes may be summed together. The result is a total file size for the bucket identifier. If the character size appended as described in Block 708 is greater than one byte, the aggregation may also include dividing the total file size by the number of bytes of the character. Because the character is appended for each search, the result of the aggregation of Block 810 is a search count associated with the bucket identifier. The search count is the number of searches performed since the last transmission to the cluster manager. The search count is the bucket search metric in the example of FIG. 6 and FIG. 7.

In Block 812, the bucket search metric is transmitted to the cluster manager responsive to expiration of the timer. Transmitting the bucket search metric may be performed as described above with reference to Block 508 of FIG. 5.

In Block 814, the bucket identifiers are removed from the bucket buffer. The bucket buffer may be implemented as a queue (e.g., first in first out queue). Thus, as a bucket identifier is obtained from the queue, the bucket identifier may be removed from the queue. In other implementations, all bucket identifiers may be removed, and bucket search metrics sent, in which all bucket identifiers are removed.

FIG. 3, FIG. 4, FIG. 5, FIG. 6, FIG. 7, and FIG. 8 describe different operations for recording and transmitting bucket search metrics to the cluster manager. FIG. 9 describes performing rebalancing on the cluster manager. In general, rebalancing is a three-phase process. In the planning phase, bucket search metrics are obtained, and planning is performed as to which buckets to move. In the moving phase, the buckets are moved. In the finalization phase, the processing of the peer nodes switches according to the movement of the buckets.

FIG. 9 is a flowchart illustrating an example process 900 for bucket search metric rebalancing across peer nodes. The example process 900 can be implemented, for example, by a computing device that comprises a processor and a non-transitory computer-readable medium. The non-transitory computer-readable medium can be storing instructions that, when executed by the processor, can cause the processor to perform the operations of the illustrated example process 900. Alternatively, or additionally, the example process 900 can be implemented using a non-transitory computer-readable medium storing instructions that, when executed by one or more processors, cause the one or more processors to perform the operations of the example process 900 of FIG. 9.

Turning to FIG. 9, in Block 902, bucket search metrics of searches performed on buckets located on the peer nodes is obtained. As described in reference to FIG. 5 and FIG. 8, each peer node transmits bucket search metrics to the cluster manager. The cluster manager receives the bucket search metrics for each bucket that has new bucket search metrics. The cluster manager then updates the bucket search metric storage on the cluster manager. The updating may include the weighted aggregation described above with reference to Block 510 of FIG. 5. For example, the updating may use the exponential decay function. Specifically, for a particular bucket in the buckets from the bucket search metric storage, an exponential decay of the historical bucket search metric is calculated based on a length of a time period since a last update of the historical bucket search metric. The result of calculating the exponential decay function is to obtain a current value for the historical bucket search metric. A new bucket search metric is obtained for the bucket from the peer node, whereby the new bucket search metric reflecting searches of the bucket performed during the current time period. The current value is added to the new bucket search metric to obtain a bucket search metric for the bucket. The historical bucket search metric in the bucket search metric storage may be replaced with the bucket search metric. The calculation of the exponential decay is identical to the calculation described in reference to Block 510 of FIG. 5. However, the historical bucket search metric in bucket search metric storage on the cluster manager is replaced instead of the backup storage on the peer node in one or more implementations.

In Block 904, the bucket search metrics are aggregated on a per peer node basis of the peer nodes to obtain an aggregated bucket search metric for each peer node of the peer nodes. Independently, for each peer node, the bucket search metrics of the peer node are identified. The bucket search metrics may be summed to obtain a total bucket search metric for the peer node. The result of Block 904 is an individual bucket search metric for each peer node.

In Block 906, an average aggregated bucket search metric across the peer nodes is calculated using the aggregated bucket search metric for each peer node of the peer nodes. The average may be a simple average that includes summing the aggregated bucket search metrics for all of the peer nodes and dividing by the total number of peer nodes. Weighted averaging or other aggregation mechanisms may be used where the peer nodes do not have identical processing resources. If multiple clusters of peer nodes exist (e.g., multiple sites), then each side of peer nodes is processed individually.

In Block 908, a first subset of the peer nodes having the aggregated bucket search metric greater than the average aggregated bucket search metric is identified. The first subset is the subset that processes too many searches or is otherwise too busy, or overloaded, processing searches as defined by the bucket search metric. As used herein, the first subset may be referred to as the overloaded subset or the overutilized subset. The overloaded subset is the subset of peer nodes having an aggregated bucket search metric greater than the average. A direct comparison may be performed to identify the overloaded subset. In some implementations, to avoid throttling, the overloaded subset has a deviation from the average of more than a threshold. For example, the threshold may be one percent of the average or another percentage of the average. As another example the threshold may be a fixed threshold.

In Block 910, identifying a second subset of the peer nodes having the aggregated bucket search metric less than the average aggregated bucket search metric is identified. The second subset is the subset of nodes that are underloaded and, thus, may receive buckets because of being less overloaded processing searches. As used herein, the second subset may be referred to as the underloaded subset or the available subset. The underloaded subset is the subset of peer nodes having an aggregated bucket search metric less than the average. A direct comparison may be performed to identify the underloaded subset. In some implementations, to avoid throttling, the underloaded subset has a deviation from the average of more than a threshold. For example, the threshold may be one percent of the average or another percentage of the average. As another example the threshold may be a fixed threshold. The threshold for identifying the underloaded subset may be different from the threshold to identify the overloaded subset.

In Block 912, for a source peer node of the overloaded subset, a subset of the buckets is selected based on the first subset having corresponding bucket search metrics, of the bucket search metrics, matching a first deviation of the aggregated bucket search metric of the source peer node from the average aggregated bucket search metric. The term "source peer node" refers to an overloaded peer node in the overloaded subset from which buckets are currently selected for being sent.

For each peer node, a corresponding deviation of the peer node from the average aggregated bucket search metric is calculated. The deviation is calculated by subtracting the average aggregated bucket search metric from the aggregated bucket search metric of the peer node. Based on the deviation, buckets existing on the source peer node are selected for moving. The subset of buckets that are selected have a total bucket search metric that is equal to the deviation of the source peer node.

In Block 914, selecting at least one target peer node of the underloaded subset is selected based on the at least one target peer node having a second deviation totaling a corresponding aggregated bucket search metric of the subset of the buckets. The term "target peer node" refers to an underloaded peer node in the overloaded subset to which buckets are currently selected for being sent. For each peer node in the underloaded subset, a corresponding deviation of the peer node from the average aggregated bucket search metric is calculated. The deviation is calculated by subtracting the aggregated bucket search metric of the peer node from the average aggregated bucket search metric. Then, for each bucket that is in the selected subset in Block 912, a corresponding target peer node is selected to receive the bucket. The corresponding target peer node has a deviation that is at least as big as the bucket search metric of the bucket. The target peer node is selected for receiving the bucket.

The processing of Blocks 912 and 914 may be performed for each of the source peer nodes having an aggregated search metric greater than the average. Further, the processing of Blocks 912 and 914 may be performed concurrently whereby buckets are selected for moving based on the target peer nodes receiving the buckets. For example, the processing of Block 912 and Block 914 may be performed as follows. For each peer node of the overloaded subset, a corresponding first deviation from the average aggregated bucket search metric is calculated, such as using the technique described above in reference to Block 912. Similarly, for each peer node of the underloaded subset, a corresponding second deviation from the average aggregated bucket search metric may be calculated, such as using the technique described above in reference to Block 914. The overloaded peer nodes and the underloaded peer nodes may be ordered based on the first deviation and the second deviation. For example, the overloaded peer nodes may be ordered in descending order according to the first deviation. Separately, the underloaded peer nodes may be ordered in descending order according to the second deviation.

A matching process may be performed to select subsets of buckets to move from the overloaded subset to the underloaded subset according to the descending orders. For example, the highest source peer node is identified, and the corresponding first deviation determined. Then the highest target peer node identified, and the corresponding second deviation determined. Different operations may be performed based on whether the first deviation is greater than the second deviation or the second deviation is greater than the first deviation.

If the second deviation is greater than or equal to the first deviation, then buckets are selected from the highest source peer node for moving only to the highest target peer node based on the total bucket search metrics of the selected buckets being equal to the first deviation. The total bucket search metrics may be subtracted from the second deviation to calculate an updated second deviation for the target bucket. Further, the plan has the selected buckets moved from the source to the target. In one implementation, the highest target peer node may be moved in descending order to a new position according to the updated second deviation. In another implementation, the highest target peer node remains as the highest target peer node and has the updated second deviation.

If the first deviation is greater than the second deviation, then buckets are selected from the highest source peer node for moving to the highest target peer node based on the total bucket search metrics of the selected buckets being equal to the second deviation. The total bucket search metrics may be subtracted from the first deviation to calculate an updated first deviation for the target bucket. Further, the plan has the selected buckets moved from the source peer node to the target peer node. The target peer node may then be marked as unavailable for moving. Then, the next highest target peer node is selected, and the process repeats for the next highest target peer node in descending order. Specifically, buckets are selected for moving to the next highest target peer node according to a comparison of the deviations.

The matching process may be repeated for each overloaded peer node. In the matching process described above, the overloaded and underloaded peer nodes are processed in descending order so that the peer nodes with the highest deviation have greater likelihood of moving closer to the average level of search processing. In another implementation, either the overloaded peer nodes or the underloaded peer nodes may be processed in descending order. Other matching processes may be used without departing from the scope of the claims.

The result of the processing of Blocks 902-914 is a plan of moving buckets. Once the plan is created, the buckets are moved in one or more implementations.

In Block 916, the subset of the buckets is moved from the source peer node to the at least one target peer node. Moving the buckets involves copying the buckets from the source peer node to the target peer nodes. In some implementations, a moved bucket is copied to the target peer node from another peer node (other than the source peer node) that also stores a copy of the bucket based on a replication factor, further described below. Data and metadata in the buckets are moved. Additionally, the bucket search metrics are copied to the respective target peer nodes. A purpose of moving the subset of buckets is to allow the at least one target peer node to be used for searching the subset of buckets rather than the source peer node resulting in load balancing of processing queries.

After moving the buckets, the subset of the buckets that are moved are made searchable on the target peer node. Making the buckets searchable identifies to the peer node and the cluster manager that the buckets can be searched. For example, an index may be created, the index on the target peer node may be updated or other operations may be performed.

In some implementations after moving the subset of the buckets, the subset of buckets is transitioned from the source peer node being a primary node with respect to the subset, to the at least one target peer node being the primary peer node with respect to the subset. Independently, for each moved bucket in the subset, primary flags associated with the bucket on the source peer node and the target peer node are flipped so that the source peer node is marked as not primary, and the target peer node is marked as being primary. The flipping of the respective flags may be an automatic operation that occurs concurrently. The transitioning of the primary may be performed for each bucket moved from a source to a target.

After moving the buckets, a finalization process may be performed to remove excess copies of buckets. The finalization process may be performed as follows:

In one or more implementations, the subset of the buckets is removed from the source peer node after moving the subset of the buckets. For each bucket, prior to removing, a check may be performed that the number of copies of the bucket across the peer cluster satisfies the replication factor. The replication factor is the defined number of copies of data (i.e., a bucket) to be stored across the peer cluster; thus, copies of a given bucket may be stored on different peer nodes based on the replication factor. The number of copies of the bucket is compared to the replication factor. The replication factor may be defined at the site level. If the number of copies is less than the replication factor, then the bucket may be kept on the source peer node as a backup copy. If the number of copies is not less than the replication factor, then the bucket may be deleted or otherwise removed from the source peer node.

The moving and finalization process may be performed for each bucket in the plan. Once the plan is executed, and the peer nodes process the searches according to the plan, the work of processing the searches is more balanced. In one or more implementations, as new data is added to the system, searches may be requested more often for the new data as compared to the old data. In such a scenario, the rebalancing process may be iteratively or continually performed. For example, new bucket search metrics may be obtained using the operations described above and new rebalancing may be performed based on the new bucket search metrics. Thus, the cluster and operations of FIGS. 1-9 is a self-rebalancing system.

Figure 10:
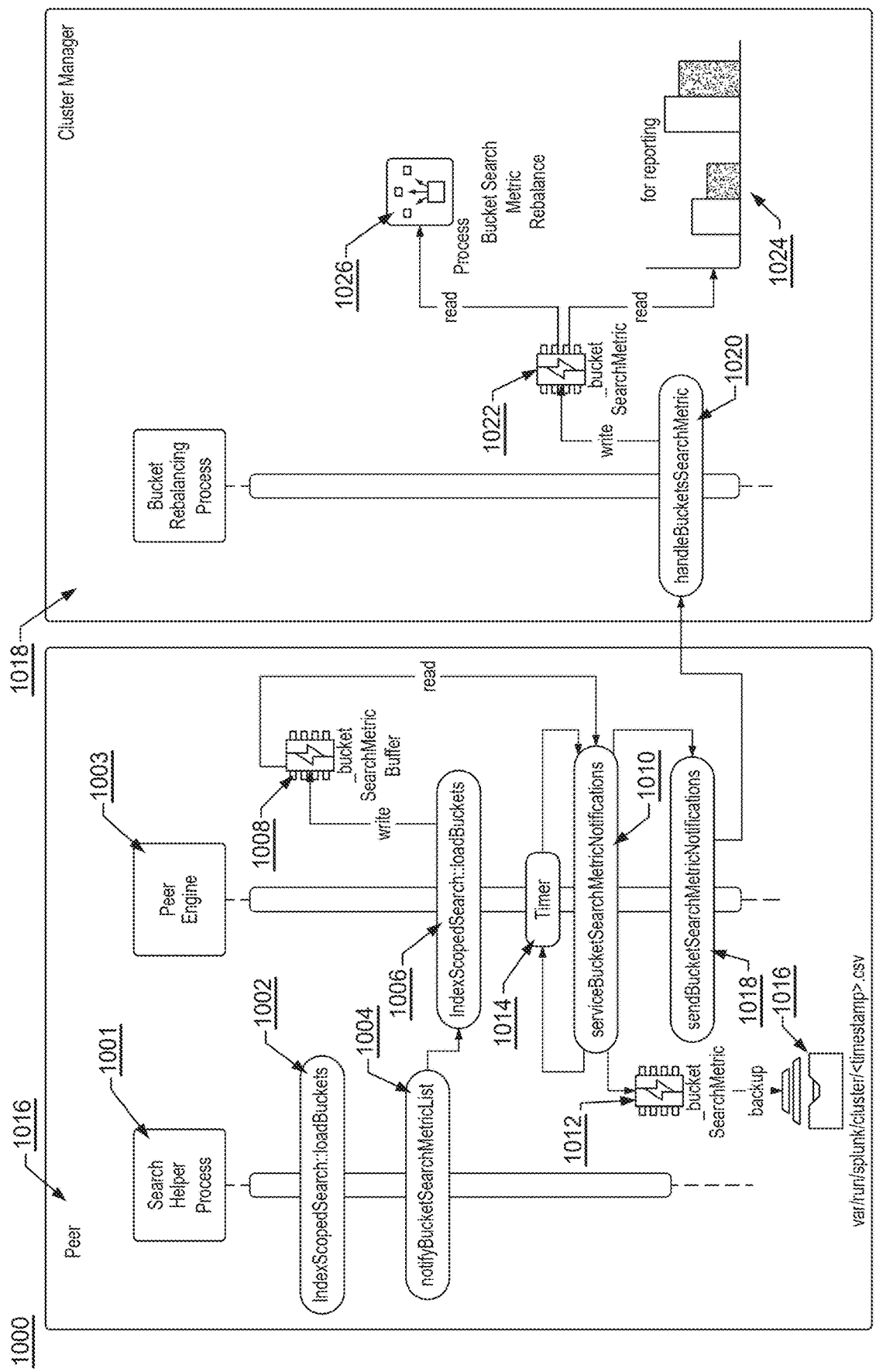
FIG. 10 illustrates an example timing diagram of gathering bucket search metrics.

FIG. 10 illustrates an example timing diagram 1000 of gathering bucket search metrics. A search of buckets is received by the search helper process 1001, and the buckets are identified 1002. The peer engine 1003 is notified 1002 with the set of bucket identifiers of the searched buckets. The peer engine 1003 receives the notification 1006 and updates the bucket buffer 1008 based on the bucket identifiers. The peer engine 1003 also checks a peer node timer 1014. Further, the peer engine 1003 updates the bucket search metric storage 1012. At the expiration of the peer node timer 1014, the peer engine checks the bucket buffer 1008 to obtain the bucket identifiers of the buckets that have new bucket search metrics and obtains the respective bucket search metrics from the bucket search metrics storage 1012. The bucket search metrics are transmitted from the peer node 1016 to the cluster manager 1018. A handler 1020 on the cluster manager 1018 receives the bucket usage metrics 1020 and updates the bucket search metric storage 1022 on the cluster manager. Based on the bucket usage metrics, the user interface may be populated with a histogram showing the bucket usage on the peer nodes in a report 1024, or a rebalancing process may be performed 1026.

Figure 11:
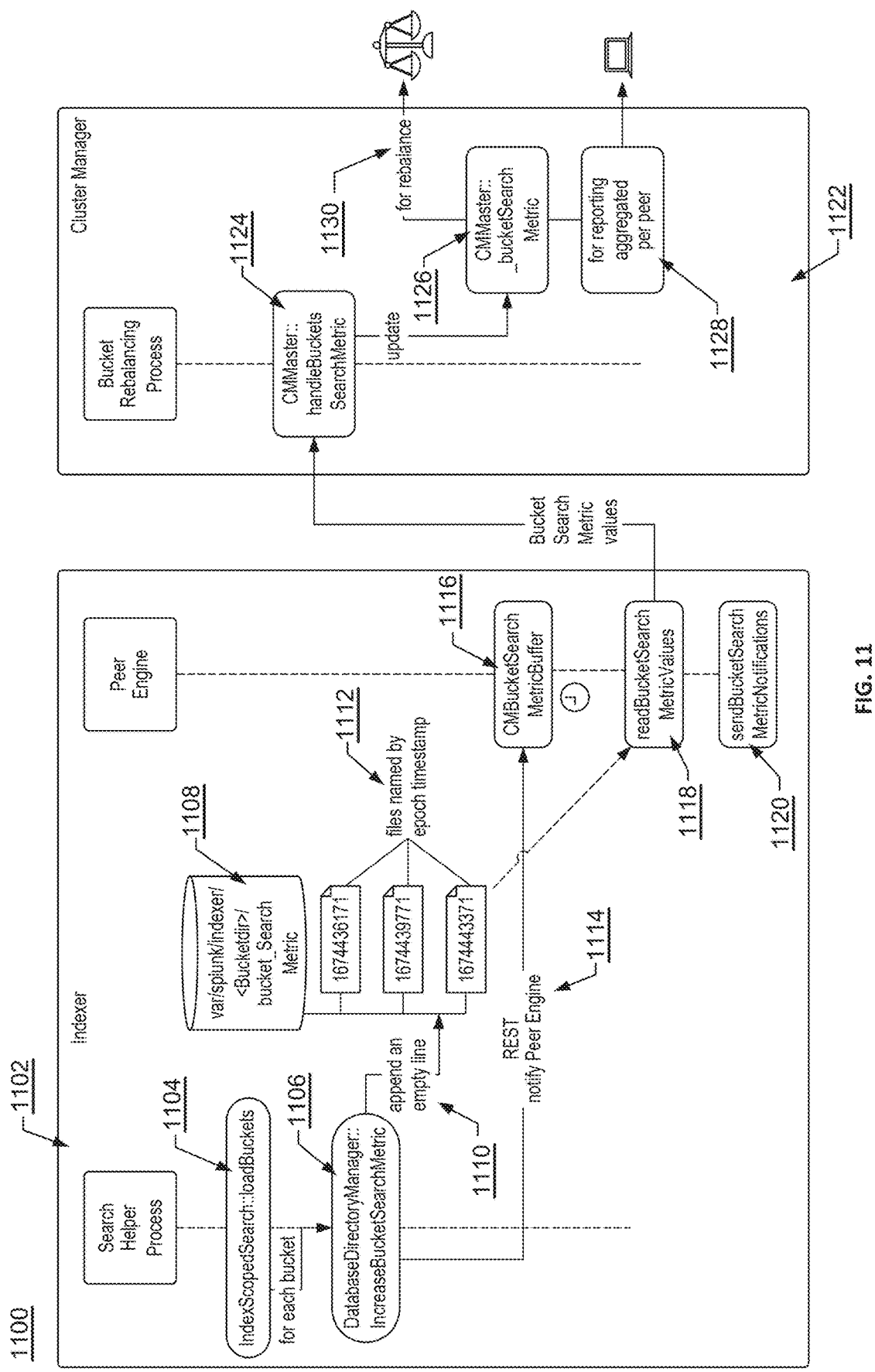
FIG. 11 illustrates an example timing diagram of gathering bucket search metrics using a file system.

FIG. 11 illustrates an example timing diagram 1100 of gathering bucket search metrics using a file system. In the example of FIG. 11, a search process on a peer node 1102 receives a query. For each bucket, the search process performs the search 1104, identifies the directory for the bucket 1106, and appends an empty line to the respective file 1110. Specifically, the file system 1108 has a directory or folder for the bucket with a set of files 1112. The set of files each have a time epoch timestamp as the file name. Appending the empty line effectively increases the search count by one as the empty line has a single byte size. The search process also sends a REST notification to the bucket buffer 1116 to update the bucket buffer with the bucket identifier of the bucket having the updated search count. At the expiration of the timer, the bucket search metrics are read from the file by identifying the file size of each file corresponding to a current set of time epochs and bucket identifiers in the bucket buffer 1118. The bucket search metrics 1120 are transmitted to the cluster manager 1122. The cluster manager receives the bucket search metrics 1124 and updates the bucket search metric storage 1126 on the cluster manager. The cluster manager 1122 may further update the user interface 1128 or perform the rebalancing 1130 as described above.

Figure 12:
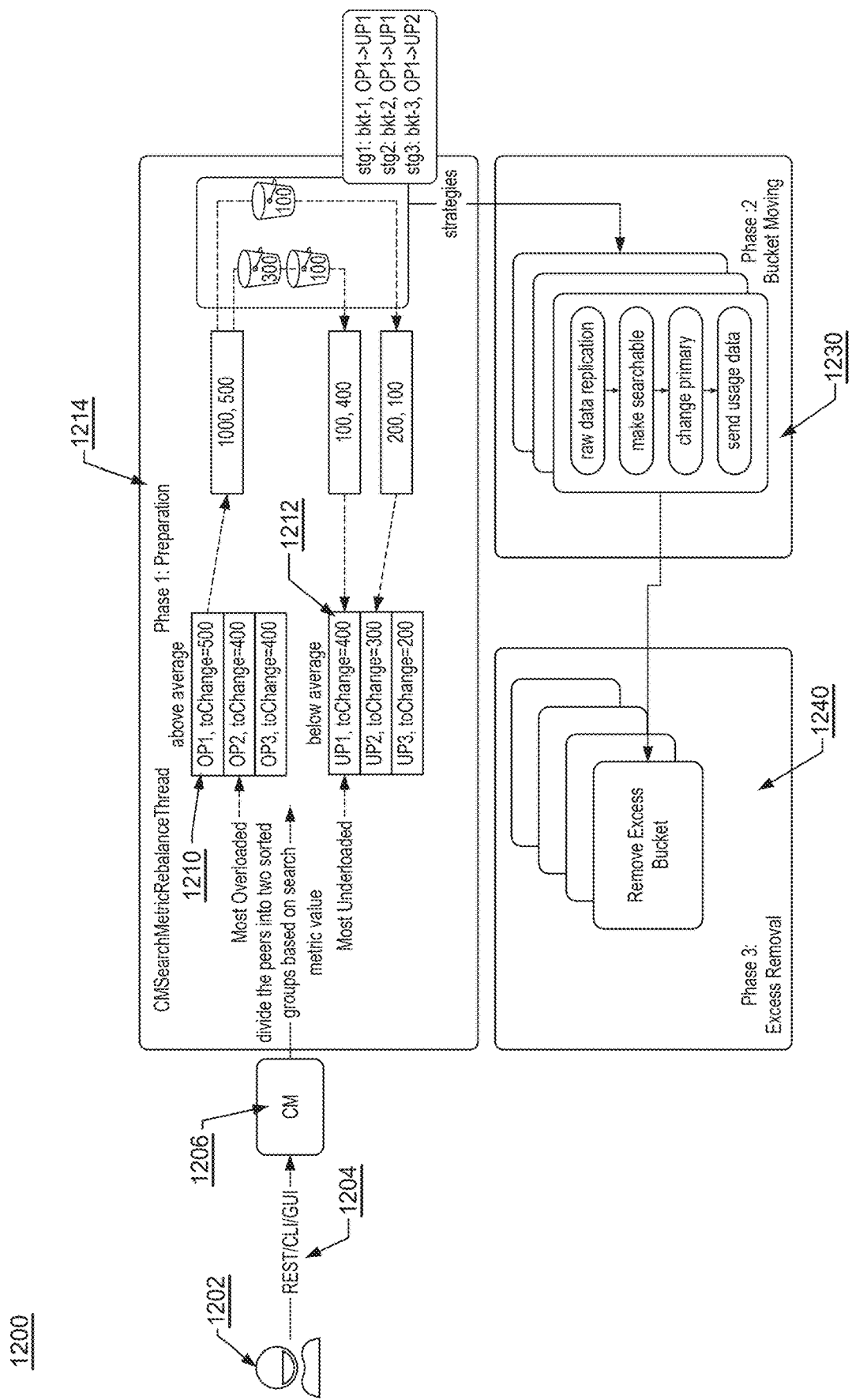
FIG. 12 illustrates an example of bucket rebalancing.

FIG. 12 shows an example timing diagram 1200 of performing bucket rebalancing.

In some cases, a bucket rebalancing may be triggered by a person 1202 using the user interface via a REST call 1204 to the cluster manager 1206. In other cases, the bucket rebalancing is triggered by a timer and an amount of deviation of the peer nodes from the average.

Regardless of the trigger, the preparation phase 1214 is performed. The bucket search metrics on the peer nodes are used to determine an aggregated bucket search metric for the peer node and an average aggregated bucket search metric for the peer node. Across the peer nodes in the example, the average aggregated bucket search metric is 500. The peer nodes may then be divided into overloaded peer nodes (OP) 1210 and underloaded peer nodes (UP) 1212, based on whether the respective aggregated search metric is above the average or below the average.

Next, the planning of the movement of buckets is performed. Each bucket's aggregated search metric is compared to the average aggregated search metric to obtain a deviation for the bucket. Overloaded Peer 1 (OP1) has an aggregated bucket search metric of 1000, which is a deviation of 500 from the average of 500. Thus, OP1 needs to move a subset of buckets having a total search metric of 500 as indicated by "toChange=500. OP1 can redistribute three buckets: A (with a bucket search metric of 300), B (with a bucket search metric of 100) and C (with a bucket search metric of 100). As shown by the box with values "1000, 500", OP1 starts with 1000 as an aggregated bucket search metric and moves a subset of buckets with a total of 500.

Underloaded Peer UP1 has an aggregated bucket search metric 100 and needs to take on 400 usage points worth of buckets (indicated by "toChange=400). Thus, OP1 distributes buckets A and B (i.e., total of the bucket search metrics is 400) to UP1 thereby increasing UP1's aggregated bucket search metric 100 to 500. Thus, as shown by the box with values "100, 400", UP1 starts with 100 as an aggregated bucket search metric and receives a subset of buckets with a total of 400.

OP1 now has one more bucket C (with a bucket search metric of 100) to distribute. UP2 initially has an aggregated bucket search metric of 200. Thus, UP2 should add one or more buckets having total bucket search metrics of 300 as indicated by "toChange=300". OP1 distributes bucket C to UP2 increasing UP2's expected aggregated bucket search metric to 300. Thus, as shown by the box with values "200, 100", UP2 starts with 200 as an aggregated bucket search metric and receives a subset of buckets from OP1 with a total of 100. Although not shown, UP2 may then receive buckets having a total bucket search metric of 200 from another overloaded peer. The planning process continues until the peers have an equitable distribution according to the bucket search metrics.

After preparation phase 1214, the buckets are moved in the bucket moving phase 1230. The bucket moving phase 1230 includes replicating the raw data, making the moved buckets searchable on the target peer node, changing the primary for the bucket from the source peer node to the target peer node, and sending the current search metrics to the target peer node.

In the excess removal phase 1240, a determination is made as to which bucket copies can be removed based on the replication factor. The excess bucket copies are removed in the excess removal phase 1240. Thus, the rebalancing complete and the new arrangement of buckets on search nodes is used to process requests. By performing the rebalancing, the amount of usage of processing resources by the peer nodes is more balanced. Thus, the latency for responding to queries is less dependent on the location of the bucket being searched. Accordingly, implementations allow for the management of the usage of the hardware resources by the peer nodes. Embodiments may be implemented within the framework illustrated in FIG. 13, FIG. 14, and FIG. 15 described below.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (Saas) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 13:
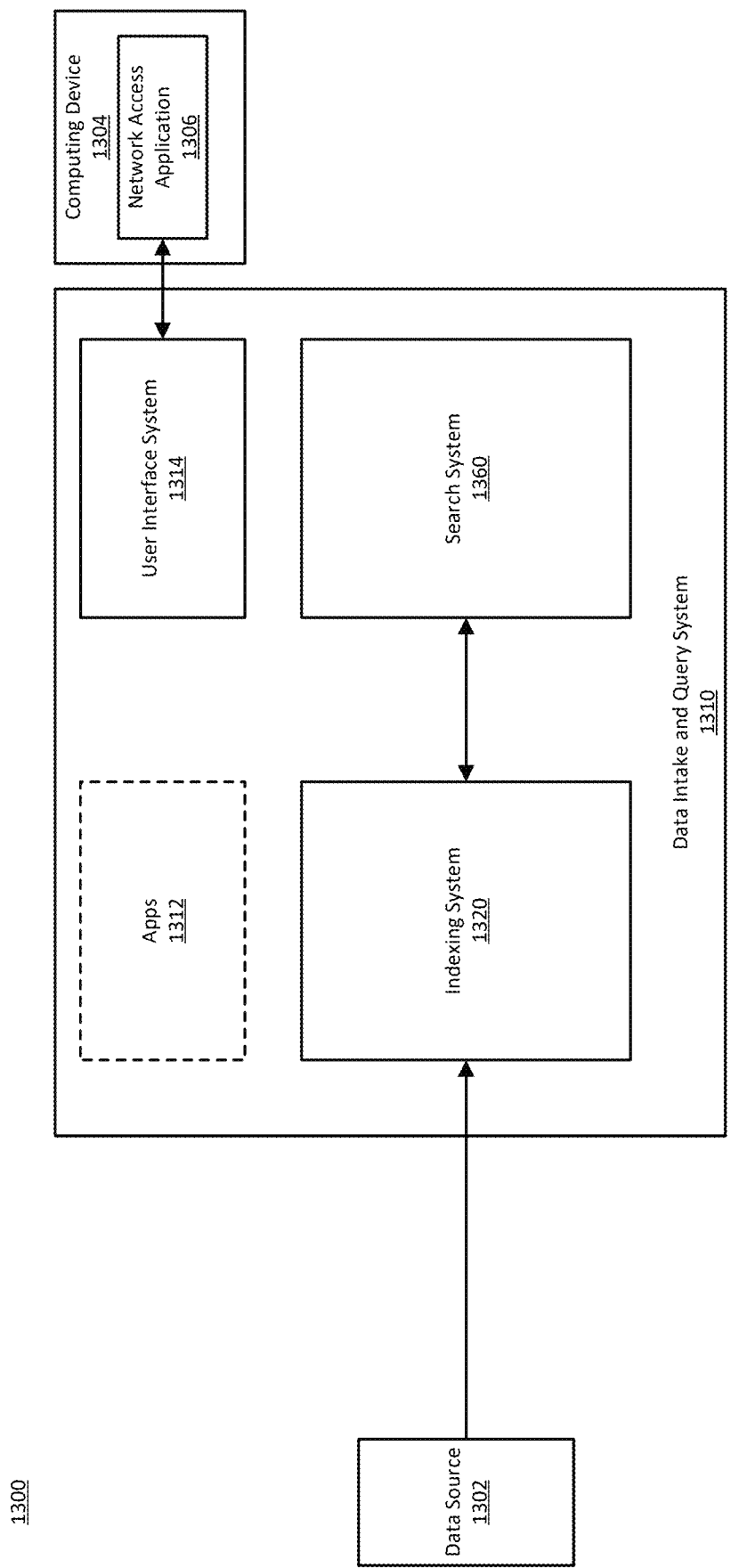
FIG. 13 illustrates an example implementation architecture diagram of a data intake and query system that processes search requests with buckets.

FIG. 13 is a block diagram illustrating an example computing environment 1300 that includes a data intake and query system 1310. The data intake and query system 1310 obtains data from a data source 1302 in the computing environment 1300, and ingests the data using an indexing system 1320. A search system 1360 of the data intake and query system 1310 enables users to navigate the indexed data. Though drawn with separate boxes in FIG. 13, in some implementations the indexing system 1320 and the search system 1360 can have overlapping components. A computing device 1304, running a network access application 1306, can communicate with the data intake and query system 1310 through a user interface system 1314 of the data intake and query system 1310. Using the computing device 1304, a user can perform various operations with respect to the data intake and query system 1310, such as administration of the data intake and query system 1310, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1310 can further optionally include apps 1312 that extend the search, analytics, and/or visualization capabilities of the data intake and query system 1310.

The data intake and query system 1310 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1310 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code, but does not include transitory propagating signals or carrier waves.

In various examples, the program code for the data intake and query system 1310 can be executed on a single computing device, or execution of the program code can be distributed over multiple computing devices. For example, the program code can include instructions for both indexing and search components (which may be part of the indexing system 1320 and/or the search system 1360, respectively), which can be executed on a computing device that also provides the data source 1302. As another example, the program code can be executed on one computing device, where execution of the program code provides both indexing and search components, while another copy of the program code executes on a second computing device that provides the data source 1302. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1302 of the computing environment 1300 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1302 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1320 obtains machine date from the data source 1302 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1320 does not require prior knowledge of the structure of incoming data (e.g., the indexing system 1320 does not need to be provided with a schema describing the data). Additionally, the indexing system 1320 retains a copy of the data as it was received by the indexing system 1320 such that the original data is always available for searching (e.g., no data is discarded, though, in some examples, the indexing system 1320 can be configured to do so).

The search system 1360 searches the data stored by the indexing system 1320. As discussed in greater detail below, the search system 1360 enables users associated with the computing environment 1300 (and possibly also other users) to navigate the data, generate reports, and visualize search results in "dashboards" output using a graphical interface. Using the facilities of the search system 1360, users can obtain insights about the data, such as retrieving events from an index, calculating metrics, searching for specific conditions within a rolling time window, identifying patterns in the data, and predicting future trends, among other examples. To achieve greater efficiency, the search system 1360 can apply map-reduce methods to parallelize searching of large volumes of data. Additionally, because the original data is available, the search system 1360 can apply a schema to the data at search time. This allows different structures to be applied to the same data, or for the structure to be modified if or when the content of the data changes. Application of a schema at search time may be referred to herein as a late-binding schema technique.

The user interface system 1314 provides mechanisms through which users associated with the computing environment 1300 (and possibly others) can interact with the data intake and query system 1310. These interactions can include configuration, administration, and management of the indexing system 1320, initiation and/or scheduling of queries that are to be processed by the search system 1360, receipt or reporting of search results, and/or visualization of search results. The user interface system 1314 can include, for example, facilities to provide a command line interface or a web-based interface.

Users can access the user interface system 1314 using a computing device 1304 that communicates with data intake and query system 1310, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1300. For example, a person can log in as a particular user and, using the user's digital information, can access the data intake and query system 1310. A user can be associated with one or more people, meaning that one or more people may be able to use the same user's digital information. For example, an administrative user account may be used by multiple people who have been given access to the administrative user account. Alternatively, or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1304 can provide a human-machine interface through which a person can have a digital presence in the computing environment 1300 in the form of a user. The computing device 1304 is an electronic device having one or more processors and a memory capable of storing instructions for execution by the one or more processors. The computing device 1304 can further include input/output (I/O) hardware and a network interface. Applications executed by the computing device 1304 can include a network access application 1306, such as a web browser, which can use a network interface of the client computing device 1304 to communicate, over a network, with the user interface system 1314 of the data intake and query system #A110. The user interface system 1314 can use the network access application 1306 to generate user interfaces that enable a user to interact with the data intake and query system #A110. A web browser is one example of a network access application. A shell tool can also be used as a network access application. In some examples, the data intake and query system 1310 is an application executing on the computing device 1304. In such examples, the network access application 1306 can access the user interface system 1314 without going over a network.

The data intake and query system 1310 can optionally include apps 1312. An app of the data intake and query system 1310 is a collection of configurations, knowledge objects (a user-defined entity that enriches the data in the data intake and query system 1310), views, and dashboards that may provide additional functionality, different techniques for searching the data, and/or additional insights into the data. The data intake and query system 1310 can execute multiple applications simultaneously. Example applications include an information technology service intelligence application, which can monitor and analyze the performance and behavior of the computing environment 1300, and an enterprise security application, which can include content and searches to assist security analysts in diagnosing and acting on anomalous or malicious behavior in the computing environment 1300.

Though FIG. 13 illustrates only one data source, in practical implementations, the computing environment 1300 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1300, the data intake and query system 1310 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 1300 can include on-prem and cloud-based computing resources, or only cloud-based resources. For example, an entity may have on-prem computing devices and a private cloud. In this example, the entity operates the data intake and query system 1310 and can choose to execute the data intake and query system 1310 on an on-prem computing device or in the cloud. In another example, a provider entity operates the data intake and query system 1310 in a public cloud and provides the functionality of the data intake and query system 1310 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1310. In some implementations, the entity providing the data intake and query system 1310 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1310, and a third entity can subscribe to the services of the second provider entity in order to use the functionality of the data intake and query system 1310. In this example, the data sources are associated with the third entity, users accessing the data intake and query system 1310 are associated with the third entity, and the analytics and insights provided by the data intake and query system 1310 are for purposes of the third entity's operations.

FIG. 14 is a block diagram illustrating in greater detail an example of an indexing system 1420 of a data intake and query system, such as the data intake and query system 1310 of FIG. 13. The indexing system 1420 of FIG. 14 uses various methods to obtain machine data from a data source 1402 and stores the data in an index 1438 of an indexer 1432. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1420 enables the data intake and query system to obtain the machine data produced by the data source 1402 and to store the data for searching and retrieval.

Users can administer the operations of the indexing system 1420 using a computing device 1404 that can access the indexing system 1420 through a user interface system 1414 of the data intake and query system. For example, the computing device 1404 can be executing a network access application 1406, such as a web browser or a terminal, through which a user can access a monitoring console 1416 provided by the user interface system 1414. The monitoring console 1416 can enable operations such as: identifying the data source 1402 for data ingestion; configuring the indexer 1432 to index the data from the data source 1402; configuring a data ingestion method; configuring, deploying, and managing clusters of indexers; and viewing the topology and performance of a deployment of the data intake and query system, among other operations. The operations performed by the indexing system 1420 may be referred to as "index time" operations, which are distinct from "search time" operations that are discussed further below.

The indexer 1432, which may be referred to herein as a data indexing component, coordinates and performs most of the index time operations. The indexer 1432 can be implemented using program code that can be executed on a computing device. The program code for the indexer 1432 can be stored on a non-transitory computer-readable medium (e.g. a magnetic, optical, or solid-state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1432. In some implementations, the indexer 1432 executes on the computing device 1404 through which a user can access the indexing system 1420. In some implementations, the indexer 1432 executes on a different computing device than the illustrated computing device 1404.

The indexer 1432 may be executing on the computing device that also provides the data source 1402 or may be executing on a different computing device. In implementations wherein the indexer 1432 is on the same computing device as the data source 1402, the data produced by the data source 1402 may be referred to as "local data." In other implementations the data source 1402 is a component of a first computing device and the indexer 1432 executes on a second computing device that is different from the first computing device. In these implementations, the data produced by the data source 1402 may be referred to as "remote data." In some implementations, the first computing device is "on-prem" and in some implementations the first computing device is "in the cloud." In some implementations, the indexer 1432 executes on a computing device in the cloud and the operations of the indexer 1432 are provided as a service to entities that subscribe to the services provided by the data intake and query system.

For a given data produced by the data source 1402, the indexing system 1420 can be configured to use one of several methods to ingest the data into the indexer 1432. These methods include upload 1422, monitor 1424, using a forwarder 1426, or using HyperText Transfer Protocol (HTTP 1428) and an event collector 1430. These and other methods for data ingestion may be referred to as "getting data in" (GDI) methods.

Using the upload 1422 method, a user can specify a file for uploading into the indexer 1432. For example, the monitoring console 1416 can include commands or an interface through which the user can specify where the file is located (e.g., on which computing device and/or in which directory of a file system) and the name of the file. The file may be located at the data source 1402 or maybe on the computing device where the indexer 1432 is executing. Once uploading is initiated, the indexer 1432 processes the file, as discussed further below. Uploading is a manual process and occurs when instigated by a user. For automated data ingestion, the other ingestion methods are used.

The monitor 1424 method enables the indexing system 1432 to monitor the data source 1402 and continuously or periodically obtain data produced by the data source 1402 for ingestion by the indexer 1432. For example, using the monitoring console 1416, a user can specify a file or directory for monitoring. In this example, the indexing system 1432 can execute a monitoring process that detects whenever the file or directory is modified and causes the file or directory contents to be sent to the indexer 1432. As another example, a user can specify a network port for monitoring. In this example, a monitoring process can capture data received at or transmitting from the network port and cause the data to be sent to the indexer 1432. In various examples, monitoring can also be configured for data sources such as operating system event logs, performance data generated by an operating system, operating system registries, operating system directory services, and other data sources.

Monitoring is available when the data source 1402 is local to the indexer 1432 (e.g., the data source 1402 is on the computing device where the indexer 1432 is executing). Other data ingestion methods, including forwarding and the event collector 1430, can be used for either local or remote data sources.

A forwarder 1426, which may be referred to herein as a data forwarding component, is a software process that sends data from the data source 1402 to the indexer 1432. The forwarder 1426 can be implemented using program code that can be executed on the computer device that provides the data source 1402. A user launches the program code for the forwarder 1426 on the computing device that provides the data source 1402. The user can further configure the forwarder 1426, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1426 can provide various capabilities. For example, the forwarder 1426 can send the data unprocessed or can perform minimal processing on the data before sending the data to the indexer 1432. Minimal processing can include, for example, adding metadata tags to the data to identify a source, source type, and/or host, among other information, dividing the data into blocks, and/or applying a timestamp to the data. In some implementations, the forwarder 1426 can break the data into individual events (event generation is discussed further below) and send the events to a receiver. Other operations that the forwarder 1426 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1430 provides an alternate method for obtaining data from the data source 1402. The event collector 1430 enables data and application events to be sent to the indexer 1432 using HTTP 1428. The event collector 1430 can be implemented using program code that can be executing on a computing device. The program code may be a component of the data intake and query system or can be a standalone component that can be executed independently of the data intake and query system and operates in cooperation with the data intake and query system.

To use the event collector 1430, a user can, for example using the monitoring console 1416 or a similar interface provided by the user interface system 1414, enable the event collector 1430 and configure an authentication token. In this context, an authentication token is a piece of digital data generated by a computing device, such as a server, which contains information to identify a particular entity, such as a user or a computing device, to the server. The token will contain identification information for the entity (e.g., an alphanumeric string that is unique to each token) and a code that authenticates the entity with the server. The token can be used, for example, by the data source 1402 as an alternative method to using a username and password for authentication.

To send data to the event collector 1430, the data source 1402 is supplied with a token and can then send HTTP 1428 requests to the event collector 1430. To send HTTP 1428 requests, the data source 1402 can be configured to use an HTTP client and/or to use logging libraries such as those supplied by Java, JavaScript, and .NET libraries. An HTTP client enables the data source 1402 to send data to the event collector 1430 by supplying the data, and a Uniform Resource Identifier (URI) for the event collector 1430 to the HTTP client. The HTTP client then handles establishing a connection with the event collector 1430, transmitting a request containing the data, closing the connection, and receiving an acknowledgment if the event collector 1430 sends one. Logging libraries enable HTTP 1428 requests to the event collector 1430 to be generated directly by the data source. For example, an application can include or link a logging library, and through functionality provided by the logging library manage establishing a connection with the event collector 1430, transmitting a request, and receiving an acknowledgement.

An HTTP 1428 request to the event collector 1430 can contain a token, a channel identifier, event metadata, and/or event data. The token authenticates the request with the event collector 1430. The channel identifier, if available in the indexing system 1420, enables the event collector 1430 to segregate and keep separate data from different data sources. The event metadata can include one or more key-value pairs that describe the data source 1402 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1430 extracts events from HTTP 1428 requests and sends the events to the indexer 1432. The event collector 1430 can further be configured to send events to one or more indexers. Extracting the events can include associating any metadata in a request with the event or events included in the request. In these implementations, event generation by the indexer 1432 (discussed further below) is bypassed, and the indexer 1432 moves the events directly to indexing. In some implementations, the event collector 1430 extracts event data from a request and outputs the event data to the indexer 1432, and the indexer generates events from the event data. In some implementations, the event collector 1430 sends an acknowledgement message to the data source 1402 to indicate that the event collector 1430 has received a particular request form the data source 1402, and/or to indicate to the data source 1402 that events in the request have been added to an index.

The indexer 1432 ingests incoming data and transforms the data into searchable knowledge in the form of events. In the data intake and query system, an event is a single piece of data that represents activity of the component represented in FIG. 14 by the data source 1402. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value, and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1432 can include a parsing module 1434 and an indexing module 1436 for generating and storing the events. The parsing module 1434 and indexing module 1436 can be modular and pipelined, such that one component can be operating on a first set of data while the second component is simultaneously operating on a second sent of data. Additionally, the indexer 1432 may at any time have multiple instances of the parsing module 1434 and indexing module 1436, with each set of instances configured to simultaneously operate on data from the same data source or from different data sources. The parsing module 1434 and indexing module 1436 are illustrated in FIG. 14 to facilitate discussion, with the understanding that implementations with other components are possible to achieve the same functionality.

The parsing module 1434 determines information about incoming event data, where the information can be used to identify events within the event data. For example, the parsing module 1434 can associate a source type with the event data. A source type identifies the data source 1402 and describes a possible data structure of event data produced by the data source 1402. For example, the source type can indicate which fields to expect in events generated at the data source 1402 and the keys for the values in the fields, and possibly other information such as sizes of fields, an order of the fields, a field separator, and so on. The source type of the data source 1402 can be specified when the data source 1402 is configured as a source of event data. Alternatively, the parsing module 1434 can determine the source type from the event data, for example from an event field in the event data or using machine learning techniques applied to the event data.

Other information that the parsing module 1434 can determine includes timestamps. In some cases, an event includes a timestamp as a field, and the timestamp indicates a point in time when the action represented by the event occurred or was recorded by the data source 1402 as event data. In these cases, the parsing module 1434 may be able to determine from the source type associated with the event data that the timestamps can be extracted from the events themselves. In some cases, an event does not include a timestamp and the parsing module 1434 determines a timestamp for the event, for example from a name associated with the event data from the data source 1402 (e.g., a file name when the event data is in the form of a file) or a time associated with the event data (e.g., a file modification time). As another example, when the parsing module 1434 is not able to determine a timestamp from the event data, the parsing module 1434 may use the time at which it is indexing the event data. As another example, the parsing module 1434 can use a user-configured rule to determine the timestamps to associate with events.

The parsing module 1434 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1434 may be able to determine event boundaries from the source type associated with the event data, for example from a data structure indicated by the source type. In some implementations, a user can configure rules the parsing module 1434 can use to identify event boundaries.

The parsing module 1434 can further extract data from events and possibly also perform transformations on the events. For example, the parsing module 1434 can extract a set of fields (key-value pairs) for each event, such as a host or hostname, source or source name, and/or source type. The parsing module 1434 may extract certain fields by default or based on a user configuration. Alternatively, or additionally, the parsing module 1434 may add fields to events, such as a source type or a user-configured field. As another example of a transformation, the parsing module 1434 can anonymize fields in events to mask sensitive information, such as social security numbers or account numbers. Anonymizing fields can include changing or replacing values of specific fields. The parsing module 1434 can further perform user-configured transformations.

The parsing module 1434 outputs the results of processing incoming event data to the indexing module 1436, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1432 can be configured to identify searchable segments that are parts of fields, searchable segments that are entire fields, or both. The parsing module 1434 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1446, to find event data that matches a search query. In some implementations, segmentation can alternatively be performed by the forwarder 1426. Segmentation can also be disabled, in which case the indexer 1432 will not build a lexicon for the event data. When segmentation is disabled, the search system searches the event data directly.

Building index data structures generates the index 1438. The index 1438 is a storage data structure on a storage device (e.g., a disk drive or other physical device for storing digital data). The storage device may be a component of the computing device on which the indexer 1432 is operating (referred to herein as local storage) or may be a component of a different computing device (referred to herein as remote storage) that the indexer 1438 has access to over a network. The indexer 1432 can manage more than one index and can manage indexes of different types. For example, the indexer 1432 can manage event indexes, which impose minimal structure on stored data and can accommodate any type of data. As another example, the indexer 1432 can manage metrics indexes, which use a highly structured format to handle the higher volume and lower latency demands associated with metrics data.

The indexing module 1436 organizes files in the index 1438 in directories referred to as buckets. The files in a bucket 1444 can include raw data files, index files, and possibly also other metadata files. As used herein, "raw data" means data as when the data was produced by the data source 1402, without alteration to the format or content. As noted previously, the parsing module 1434 may add fields to event data and/or perform transformations on fields in the event data. Event data that has been altered in this way is referred to herein as enriched data. A raw data file 1448 can include enriched data, in addition to or instead of raw data. The raw data file 1448 may be compressed to reduce disk usage. An index file 1446, which may also be referred to herein as a "time-series index" or tsidx file, contains metadata that the indexer 1432 can use to search a corresponding raw data file 1448. As noted above, the metadata in the index file 1446 includes a lexicon of the event data, which associates each unique keyword in the event data with a reference to the location of event data within the raw data file

1448. The keyword data in the index file 1446 may also be referred to as an inverted index. In various implementations, the data intake and query system can use index files for other purposes, such as to store data summarizations that can be used to accelerate searches.

A bucket 1444 includes event data for a particular range of time. The indexing module 1436 arranges buckets in the index 1438 according to the age of the buckets, such that buckets for more recent ranges of time are stored in short-term storage 1440 and buckets for less recent ranges of time are stored in long-term storage 1442. Short-term storage 1440 may be faster to access while long-term storage 1442 may be slower to access. Buckets may be moves from short-term storage 1440 to long-term storage 1442 according to a configurable data retention policy, which can indicate at what point in time a bucket is old enough to be moved.

A bucket's location in short-term storage 1440 or long-term storage 1442 can also be indicated by the bucket's status. As an example, a bucket's status can be "hot," "warm," "cold," "frozen," or "thawed." In this example, hot bucket is one to which the indexer 1432 is writing data and the bucket becomes a warm bucket when the index 1432 stops writing data to it. In this example, both hot and warm buckets reside in short-term storage 1440. Continuing this example, when a warm bucket is moved to long-term storage 1442, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1420 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1420 through the monitoring console 1416 provided by the user interface system 1414. Using the monitoring console 1416, the user can configure and monitor an index cluster, and see information such as disk usage by an index, volume usage by an indexer, index and volume size over time, data age, statistics for bucket types, and bucket settings, among other information.

Figure 15:
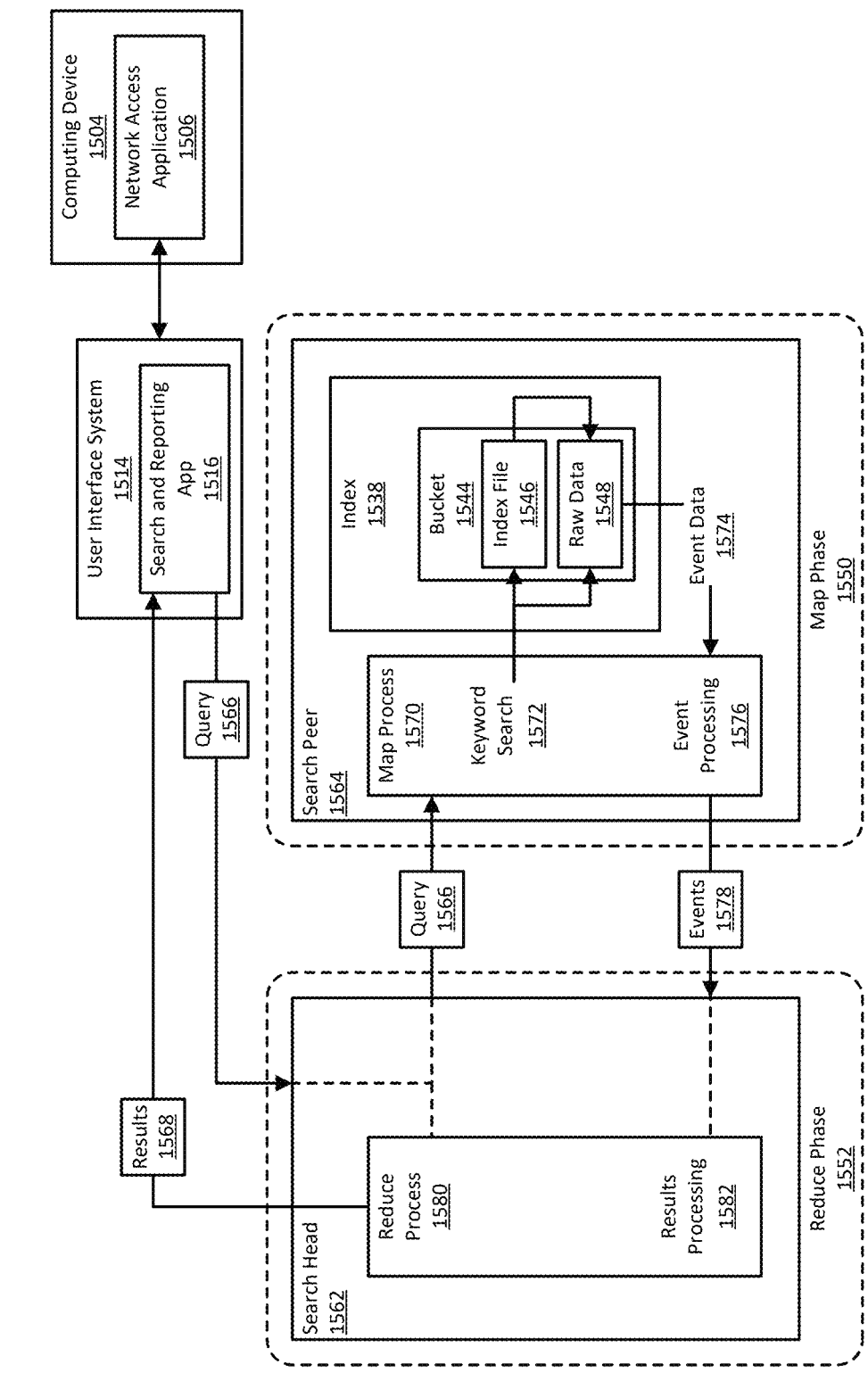
FIG. 15 illustrates an example implementation architecture diagram of a data intake and query system processing queries.

FIG. 15 is a block diagram illustrating in greater detail an example of the search system 1560 of a data intake and query system, such as the data intake and query system 1310 of FIG. 13. The search system 1560 of FIG. 15 issues a query 1566 to a search head 1562, which sends the query 1566 to a search peer 1564. Using a map process 1570, the search peer 1564 searches the appropriate index 1538 for events identified by the query 1566 and sends events 1578 so identified back to the search head 1562. Using a reduce process 1582, the search head 1562 processes the events 1578 and produces results 1568 to respond to the query 1566. The results 1568 can provide useful insights about the data stored in the index 1538. These insights can aid in the administration of information technology systems, in security analysis of information technology systems, and/or in analysis of the development environment provided by information technology systems.

The query 1566 that initiates a search is produced by a search and reporting app 1516 that is available through the user interface system 1514 of the data intake and query system. Using a network access application 1506 executing on a computing device 1504, a user can input the query 1566 into a search field provided by the search and reporting app 1516. Alternatively, or additionally, the search and reporting app 1516 can include pre-configured queries or stored queries that can be activated by the user. In some cases, the search and reporting app 1516 initiates the query 1566 when the user enters the query 1566. In these cases, the query 1566 maybe referred to as an "ad-hoc" query. In some cases, the search and reporting app 1516 initiates the query 1566 based on a schedule. For example, the search and reporting app 1516 can be configured to execute the query 1566 once per hour, once per day, at a specific time, on a specific date, or at some other time that can be specified by a date, time, and/or frequency. These types of queries maybe referred to as scheduled queries.

The query 1566 is specified using a search processing language. The search processing language includes commands or search terms that the search peer 1564 will use to identify events to return in the search results 1568. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1566 to include sequential commands, where a subsequent command may operate on the results of a prior command. As an example, sequential commands may be separated in the query 1566 by a vertical line ("|" or "pipe") symbol.

In addition to one or more search commands, the query 1566 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1566 occurs in two broad phases: a map phase 1550 and a reduce phase 1552. The map phase 1550 takes place across one or more search peers. In the map phase 1550, the search peers locate event data that matches the search terms in the search query 1566 and sorts the event data into field-value pairs. When the map phase 1550 is complete, the search peers send events that they have found to one or more search heads for the reduce phase 1552. During the reduce phase 1552, the search heads process the events through commands in the search query 1566 and aggregate the events to produce the final search results 1568.

A search head, such as the search head 1562 illustrated in FIG. 15, is a component of the search system 1560 that manages searches. The search head 1562, which may also be referred to herein as a search management component, can be implemented using program code that can be executed on a computing device. The program code for the search head 1562 can be stored on a non-transitory computer-readable medium and from this medium can be loaded or copied to the memory of a computing device. One or more hardware processors of the computing device can read the program code from the memory and execute the program code in order to implement the operations of the search head 1562.

Upon receiving the search query 1566, the search head 1562 directs the query 1566 to one or more search peers, such as the search peer 1564 illustrated in FIG. 15. "Search peer" is an alternate name for "indexer" and a search peer may be largely similar to the indexer described previously. The search peer 1564 may be referred to as a "peer node" when the search peer 1564 is part of an indexer cluster. The search peer 1564, which may also be referred to as a search execution component, can be implemented using program code that can be executed on a computing device. In some implementations, one set of program code implements both the search head 1562 and the search peer 1564 such that the search head 1562 and the search peer 1564 form one component. In some implementations, the search head 1562 is an independent piece of code that performs searching and no indexing functionality. In these implementations, the search head 1562 may be referred to as a dedicated search head.

The search head 1562 may consider multiple criteria when determining whether to send the query 1566 to the particular search peer 1564. For example, the search system 1560 may be configured to include multiple search peers that each have duplicative copies of at least some of the event data and are implanted using different hardware resources q. In this example, the sending the search query 1566 to more than one search peer allows the search system 1560 to distribute the search workload across different hardware resources. As another example, search system 1560 may include different search peers for different purposes (e.g., one has an index storing a first type of data or from a first data source while a second has an index storing a second type of data or from a second data source). In this example, the search query 1566 may specify which indexes to search, and the search head 1562 will send the query 1566 to the search peers that have those indexes.

To identify events 1578 to send back to the search head 1562, the search peer 1564 performs a map process 1570 to obtain event data 1574 from the index 1538 that is maintained by the search peer 1564. During a first phase of the map process 1570, the search peer 1564 identifies buckets that have events that are described by the time indicator in the search query 1566. As noted above, a bucket contains events whose timestamps fall within a particular range of time. For each bucket 1544 whose events can be described by the time indicator, during a second phase of the map process 1570, the search peer 1564 performs a keyword search 1572 using search terms specified in the search query 1566. The search terms can be one or more of keywords, phrases, fields, Boolean expressions, and/or comparison expressions that in combination describe events being searched for. When segmentation is enabled at index time, the search peer 1564 performs the keyword search 1572 on the bucket's index file 1546. As noted previously, the index file 1546 includes a lexicon of the searchable terms in the events stored in the bucket's raw data 1548 file. The keyword search 1572 searches the lexicon for searchable terms that correspond to one or more of the search terms in the query 1566. As also noted above, the lexicon incudes, for each searchable term, a reference to each location in the raw data 1548 file where the searchable term can be found. Thus, when the keyword search identifies a searchable term in the index file 1546 that matches a search term in the query 1566, the search peer 1564 can use the location references to extract from the raw data 1548 file the event data 1574 for each event that include the searchable term.

In cases where segmentation was disabled at index time, the search peer 1564 performs the keyword search 1572 directly on the raw data 1548 file. To search the raw data 1548, the search peer 1564 may identify searchable segments in events in a similar manner as when the data was indexed. Thus, depending on how the search peer 1564 is configured, the search peer 1564 may look at event fields and/or parts of event fields to determine whether an event matches the query 1566. Any matching events can be added to the event data #A74 read from the raw data 1548 file. The search peer 1564 can further be configured to enable segmentation at search time, so that searching of the index 1538 causes the search peer 1564 to build a lexicon in the index file 1546.

The event data 1574 obtained from the raw data 1548 file includes the full text of each event found by the keyword search 1572. During a third phase of the map process 1570, the search peer 1564 performs event processing 1576 on the event data 1574, with the steps performed being determined by the configuration of the search peer 1564 and/or commands in the search query 1566. For example, the search peer 1564 can be configured to perform field discovery and field extraction. Field discovery is a process by which the search peer 1564 identifies and extracts key-value pairs from the events in the event data 1574. The search peer 1564 can, for example, be configured to automatically extract the first 100 fields (or another number of fields) in the event data 1574 that can be identified as key-value pairs. As another example, the search peer 1564 can extract any fields explicitly mentioned in the search query 1566. The search peer 1564 can, alternatively or additionally, be configured with particular field extractions to perform.

Other examples of steps that can be performed during event processing 1576 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1564 sends processed events 1578 to the search head 1562, which performs a reduce process 1580. The reduce process 1580 potentially receives events from multiple search peers and performs various results processing 1582 steps on the received events. The results processing 1582 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1582 can further include applying commands from the search query 1566 to the events. The query 1566 can include, for example, commands for evaluating and/or manipulating fields (e.g., to generate new fields from existing fields or parse fields that have more than one value). As another example, the query 1566 can include commands for calculating statistics over the events, such as counts of the occurrences of fields, or sums, averages, ranges, and so on, of field values. As another example, the query 1566 can include commands for generating statistical values for purposes of generating charts of graphs of the events.

The reduce process 1580 outputs the events found by the search query 1566, as well as information about the events. The search head 1562 transmits the events and the information about the events as search results 1568, which are received by the search and reporting app 1516. The search and reporting app 1516 can generate visual interfaces for viewing the search results 1568. The search and reporting app 1516 can, for example, output visual interfaces for the network access application 1506 running on a computing device 1504 to generate.

The visual interfaces can include various visualizations of the search results 1568, such as tables, line or area charts, Chloropleth maps, or single values. The search and reporting app 1516 can organize the visualizations into a dashboard, where the dashboard includes a panel for each visualization. A dashboard can thus include, for example, a panel listing the raw event data for the events in the search results 1568, a panel listing fields extracted at index time and/or found through field discovery along with statistics for those fields, and/or a timeline chart indicating how many events occurred at specific points in time (as indicated by the timestamps associated with each event). In various implementations, the search and reporting app 1516 can provide one or more default dashboards. Alternatively, or additionally, the search and reporting app 1516 can include functionality that enables a user to configure custom dashboards.

The search and reporting app 1516 can also enable further investigation into the events in the search results 1568. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1566. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
    obtaining a plurality of bucket search metrics of searches performed on a plurality of buckets located on a plurality of peer nodes;
    aggregating the plurality of bucket search metrics on a per peer node basis of the plurality of peer nodes to obtain an aggregated bucket search metric for each peer node of the plurality of peer nodes;
    determining an average aggregated bucket search metric across the plurality of peer nodes using the aggregated bucket search metric for each peer node of the plurality of peer nodes;

identifying a first subset of the plurality of peer nodes, wherein the aggregated bucket search metric of each peer node in the first subset is greater than the average aggregated bucket search metric, wherein a source peer node of the first subset includes a first deviation of a first aggregated bucket search metric of the source peer node from the average aggregated bucket search metric;

identifying a selected subset of buckets of the plurality of buckets on the source peer node, wherein the selected subset of buckets is identified based on having a search metric value that corresponds to the first deviation; and moving one or more buckets of the selected subset of buckets from the source peer node to at least one target peer node of a second subset of the plurality of peer nodes by copying data and metadata of the one or more buckets of the selected subset of buckets to the at least one target peer node to maintain data for storage, search, and retrieval and to reduce processing latency in the source peer node through redistribution of one or more high-usage buckets in a distributed computing environment, wherein the aggregated bucket search metric of each peer node in the second subset is less than the average aggregated bucket search metric.

2. The computer-implemented method of claim 1, wherein:

the at least one target peer node includes a second deviation of a second aggregated search metric of the at least one target peer node from the average aggregated bucket search metric, and the second deviation of the at least one target peer node is greater than or equal to a bucket search metric value associated with the one or more buckets of the selected subset of buckets.

3. The computer-implemented method of claim 1, further comprising:

calculating, for each peer node of the first subset, a corresponding deviation from the average aggregated bucket search metric;

ordering, in descending order, the first subset of the plurality of peer nodes according to the corresponding deviation; and moving, according to the descending order, subsets of the plurality of buckets from the first subset to the second subset.

4. The computer-implemented method of claim 1, further comprising:

calculating, for each peer node of the second subset, a corresponding deviation from the average aggregated bucket search metric;

ordering, in descending order, the second subset of the plurality of peer nodes according to the corresponding deviation; and selecting, according to the descending order, from the second subset of the plurality of peer nodes, the at least one target peer node.

5. The computer-implemented method of claim 1, further comprising:

making the one or more buckets of the selected subset of buckets searchable on the at least one target peer node after moving the one or more buckets of the selected subset of the plurality of buckets; and removing the one or more buckets of the selected subset of buckets from the source peer node after moving the one or more buckets of the selected subset of buckets.

6. The computer-implemented method of claim 1, further comprising:

transitioning, after moving the one or more buckets of the selected subset of the plurality of buckets, from the source peer node being a primary peer node with respect to the one or more buckets of the selected subset, to the at least one target peer node being the primary peer node with respect to the one or more buckets of the selected subset.

7. The computer-implemented method of claim 1, further comprising:

matching each bucket in the one or more buckets of the selected subset of the plurality of buckets to a corresponding target peer node of the at least one target peer node by matching a corresponding bucket search metric of the bucket to a corresponding deviation of the target peer node.

8. The computer-implemented method of claim 1, wherein obtaining the plurality of bucket search metrics comprises:

obtaining a historical bucket search metric of a bucket in the plurality of buckets from a bucket search metric storage;

calculating an exponential decay of the historical bucket search metric based on a length of a time period since a last update of the historical bucket search metric to obtain a current value for the historical bucket search metric;

obtaining a new bucket search metric for the bucket, the new bucket search metric reflecting first searches of the bucket performed during the time period;

adding the current value to the new bucket search metric to obtain a bucket search metric for the bucket; and replacing the historical bucket search metric in the bucket search metric storage with the bucket search metric.

9. The computer-implemented method of claim 1, further comprising:

receiving, by a search helper process on a peer node of the plurality of peer nodes, a search of a set of buckets located on the peer node, the set of buckets in the plurality of buckets;

triggering, by the search helper process, a peer engine on the peer node responsive to the search;

incrementing, by the peer engine on the peer node, a search count of a bucket in the set of buckets responsive to the search and the triggering; and transmitting, by the peer engine, the search count as a bucket search metric of the bucket responsive to an expiration of a timer, wherein the bucket search metric is in the plurality of bucket search metrics.

10. The computer-implemented method of claim 1, further comprising:

detecting an expiration of a timer;

obtaining, from a bucket buffer on a peer node of the plurality of peer nodes, a bucket identifier responsive to the expiration of the timer;

obtaining, from a bucket search metric storage on the peer node, a bucket search metric of a bucket and corresponding to the bucket identifier responsive to the bucket identifier being in the bucket buffer, wherein the bucket is in a set of buckets located on the peer node, and wherein the set of buckets is in the plurality of buckets; and transmitting the bucket search metric of the bucket responsive to the expiration of the timer.

11. The computer-implemented method of claim 1, further comprising:

receiving, by a peer node of the plurality of peer nodes, a search of a set of buckets located on the peer node, the set of buckets in the plurality of buckets;

incrementing, by the peer node, a search count of a bucket in the set of buckets responsive to the search, wherein the search count is located in a bucket search metric storage;

updating a bucket buffer with a bucket identifier of the bucket responsive to the search;

detecting an expiration of a timer;

obtaining, from the bucket buffer, the bucket identifier responsive to the expiration of the timer;

obtaining, from the bucket search metric storage, the search count corresponding to the bucket identifier responsive to the bucket identifier being in the bucket buffer; and transmitting the search count as a bucket search metric of the bucket responsive to the expiration of the timer.

12. The computer-implemented method of claim 1, further comprising:

receiving, by a peer node of the plurality of peer nodes, a search of a set of buckets located on the peer node, the set of buckets in the plurality of buckets;

appending, by the peer node, a new line character to a file related to a bucket in the set of buckets responsive to the search, wherein the file excludes data being searched by the search;

detecting an expiration of a timer;

obtaining a file size of the file, wherein the file size corresponds to a number of new line characters in the file; and transmitting the file size as a bucket search metric of the bucket responsive to the expiration of the timer.

13. The computer-implemented method of claim 1, further comprising:

receiving, by a peer node of the plurality of peer nodes, a search of a set of buckets located on the peer node, the set of buckets in the plurality of buckets;

selecting, responsive to the search, a file related to a bucket in the set of buckets based on the file having a file name comprising a current time epoch, wherein the file excludes data being searched by the search;

appending, by the peer node, a new line character to the file responsive to the search;

obtaining a file size of the file, wherein the file size corresponds to a number of new line characters in the file; and transmitting the file size as a bucket search metric of the bucket.

14. The computer-implemented method of claim 1, further comprising:

receiving, by a peer node of the plurality of peer nodes, a search of a set of buckets located on the peer node, the set of buckets in the plurality of buckets;

selecting, responsive to the search, a folder in a directory structure that matches a bucket in the set of buckets;

appending, by the peer node, a new line character to a file in the folder responsive to the search, wherein the file excludes data being searched by the search; and transmitting a file size of the file as a bucket search metric of the bucket.

15. The computer-implemented method of claim 1, further comprising:

receiving, by a peer node of the plurality of peer nodes, a search of a set of buckets located on the peer node, the set of buckets in the plurality of buckets;

selecting, responsive to the search, a file in a plurality of files that match a bucket in the set of buckets based on the file having a file name comprising a current time epoch of a plurality of time epochs corresponding to the plurality of files;

appending, by the peer node, a new line character to the file responsive to the search;

aggregating, across the plurality of files, a file size to obtain a bucket search metric of the bucket; and transmitting the bucket search metric of the bucket.

16. The computer-implemented method of claim 1, wherein the plurality of bucket search metrics for a bucket of the plurality of buckets comprises at least one selected from a group consisting of a number of searches to the bucket, an event count of data returned responsive to a plurality of searches to the bucket, and an amount of data returned responsive to the plurality of searches to the bucket.

17. A computing system, comprising:

a processor; and a non-transitory computer-readable medium having stored thereon instructions that, when executed by the processor, cause the processor to perform operations including:

obtaining a plurality of bucket search metrics of searches performed on a plurality of buckets located on a plurality of peer nodes, aggregating the plurality of bucket search metrics on a per peer node basis of the plurality of peer nodes to obtain an aggregated bucket search metric for each peer node of the plurality of peer nodes, calculating an average aggregated bucket search metric across the plurality of peer nodes using the aggregated bucket search metric for each peer node of the plurality of peer nodes, identifying a first subset of the plurality of peer nodes, wherein the aggregated bucket search metric of each peer node in the first subset is greater than the average aggregated bucket search metric, wherein a source peer node of the first subset includes a first deviation of a first aggregated bucket search metric of the source peer node from the average aggregated bucket search metric, identifying a selected subset of buckets of the plurality of buckets on the source peer node, wherein the selected subset of buckets is identified based on having a search metric value that corresponds to the first deviation, and moving one or more buckets of the selected subset of buckets from the source peer node to at least one target peer node of a second subset of the plurality of peer nodes by copying data and metadata of the one or more buckets of the selected subset of buckets to the at least one target peer node to maintain data for storage, search, and retrieval and to reduce processing latency in the source peer node through redistribution of one or more high-usage buckets in a distributed computing environment, wherein the aggregated bucket search metric of each peer node in the second subset is less than the average aggregated bucket search metric.

18. The computing system of claim 17, wherein:

the at least one target peer node includes a second deviation of a second aggregated search metric of the at least one target peer node from the average aggregated bucket search metric, and the second deviation of the at least one target peer node is greater than or equal to a bucket search metric value associated with the one or more buckets of the selected subset of buckets.

19. A non-transitory computer-readable medium having stored thereon instructions that, when executed by one or more processors, cause the one or more processor to perform operations including:
- obtaining a plurality of bucket search metrics of searches performed on a plurality of buckets located on a plurality of peer nodes;
- aggregating the plurality of bucket search metrics on a per peer node basis of the plurality of peer nodes to obtain an aggregated bucket search metric for each peer node of the plurality of peer nodes;
- calculating an average aggregated bucket search metric across the plurality of peer nodes using the aggregated bucket search metric for each peer node of the plurality of peer nodes;
- identifying a first subset of the plurality of peer nodes, wherein the aggregated bucket search metric of each peer node in the first subset is greater than the average aggregated bucket search metric, wherein a source peer node of the first subset includes a first deviation of a first aggregated bucket search metric of the source peer node from the average aggregated bucket search metric;
- identifying a selected subset of buckets of the plurality of buckets on the source peer node, wherein the selected subset of buckets is identified based on having a search metric value that corresponds to the first deviation; and
- moving one or more buckets of the selected subset of buckets from the source peer node to at least one target peer node of a second subset of the plurality of peer nodes by copying data and metadata of the one or more buckets of the selected subset of buckets to the at least one target peer node to maintain data for storage, search, and retrieval and to reduce processing latency in the source peer node through redistribution of one or more high-usage buckets in a distributed computing environment, wherein the aggregated bucket search metric of each peer node in the second subset is less than the average aggregated bucket search metric.

20. The non-transitory computer-readable medium of claim 19, wherein:
- the at least one target peer node includes a second deviation of a second aggregated search metric of the at least one target peer node from the average aggregated bucket search metric, and
- the second deviation of the at least one target peer node is greater than or equal to a bucket search metric value associated with the one or more buckets of the selected subset of buckets.

* * * * *